SYSTEM FOR AUTOMATIC CORRECTION OF BURST-ERRORS

Filed Jan. 20, 1966 8 Sheets-Sheet 1

INVENTOR.
CHITOOR V. SRINIVASAN
BY [signature]
Attorney

INVENTOR.
CHITOOR V. SRINIVASAN
BY
Samuel Cohen
Attorney

INVENTOR.
CHITOOR V. SRINIVASAN
BY Samuel Cohen
Attorney

Fig. 6.
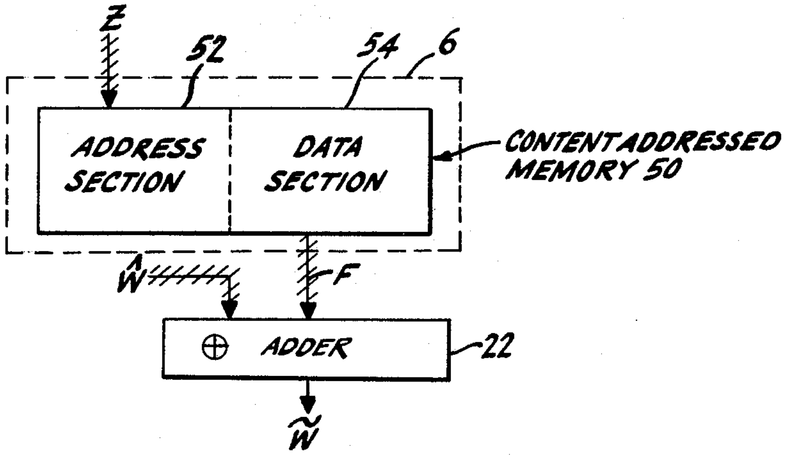
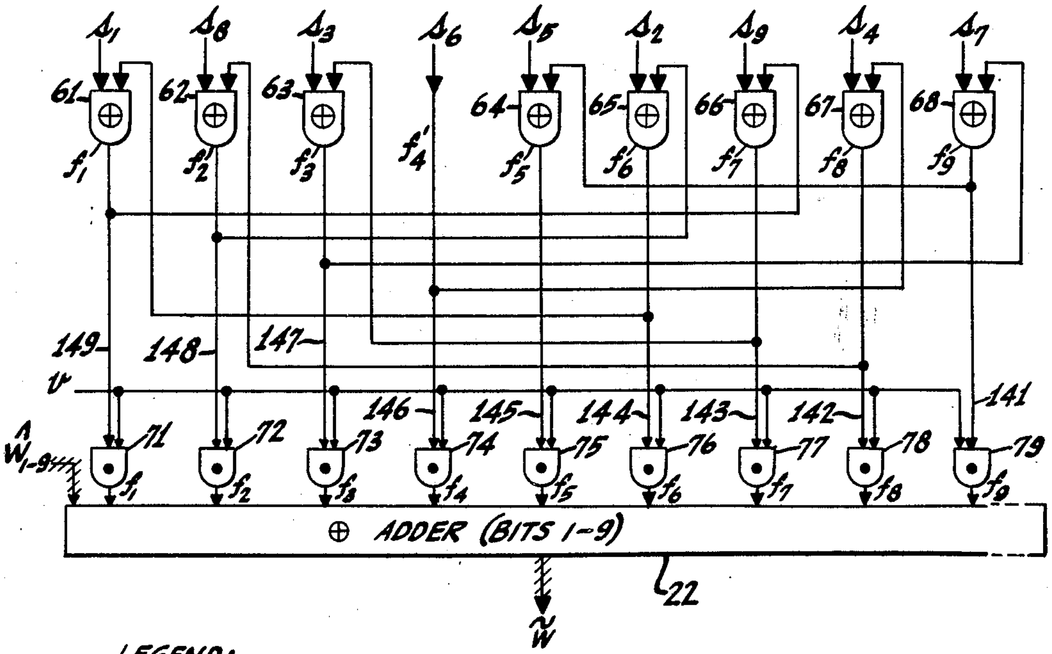
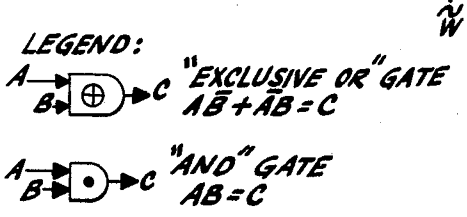
Fig. 7.
INVENTOR.
CHITOOR V. SRINIVASAN
BY Samuel Cohen
Attorney INVENTOR.
CHITOOR V. SRINIVASAN
BY
Samuel Cohen
Attorney INVENTOR.
CHITOOR V. SRINIVASAN
BY
Samuel Cohen
Attorney

SYSTEM FOR AUTOMATIC CORRECTION OF BURST-ERRORS

Filed Jan. 20, 1966

INVENTOR.
CHITOOR V. SRINIVASAN
BY
Attorney

INVENTOR.
CHITOOR V. SRINIVASAN
BY
Attorney

United States Patent Office 3,478,313

Patented Nov. 11, 1969

3,478,313

SYSTEM FOR AUTOMATIC CORRECTION OF BURST-ERRORS

Chitoor V. Srinivasan, Princeton, N.J., assignor to RCA Corporation, a corporation of Delaware Filed Jan. 20, 1966, Ser. No. 521,910

Int. Cl. G08b *29/00*; G06f *11/00*

U.S. Cl. 340—146.1 5 Claims

ABSTRACT OF THE DISCLOSURE

Information bits are arranged in subsets and a check bit is generated for each subset. These bits are then transmitted in segments, each segment consisting of a group of information bits chosen from different subsets and a check bit chosen from yet another subset. At the receiving end of the system a "syndrome" is generated which indicates whether any errors have occurred and if so the particular bit or bits which are in error. This syndrome is employed automatically to correct the received word.

This invention relates to information handling and transmission and particularly to burst-error correction systems for binary data.

A general object of the invention is to provide a coding arrangement for transmitted data and a decoding arrangement for received data which together automatically correct bursts of errors in the data.

Another object of the invention is to provide a new and improved error correcting code which is relatively economical in that a relatively small number of check digits is employed for a relatively large number of information digits and in that this relatively small number of check digits can correct error bursts of substantial length.

Another object of the invention is to provide burst-error correction systems which are suitable for use both in systems such as memory systems where the bits may be transmitted in parallel and also in systems such as communications systems where the bits may be transmitted in serial fashion.

In the system of the invention, the information bits are arranged in sub-sets in accordance with some rules discussed in detail below and a check bit is generated for each such sub-set of information bits. The information and check bits are then transmitted in a certain order or grouping. At the receiving end of the system, the information and check bits are examined and a word known as a "syndrome" is generated. If there is an error in the word, as received, the syndrome will contain one or more 1's in positions indicative of the information or check bit or bits which are in error. The system also includes means responsive to the syndrome for indicating whether an error has occurred during the transmission and, if so, the particular bit or bits which are in error. An error correcting circuit responsive to the last-named means automatically corrects for any such error or errors.

The invention is discussed in greater detail below and is shown in the following drawings of which:

FIGURE 6 is a block circuit diagram of another embodiment of an error indicating circuit according to the invention;

FIGURES 7, 8 and 9 are block circuit diagrams of the circuit within block 20 of FIGURE 1 for an embodiment of the invention in which decoder gates are employed for correcting errors;

Figures 10A, 10B, 10C, 10D, 12:
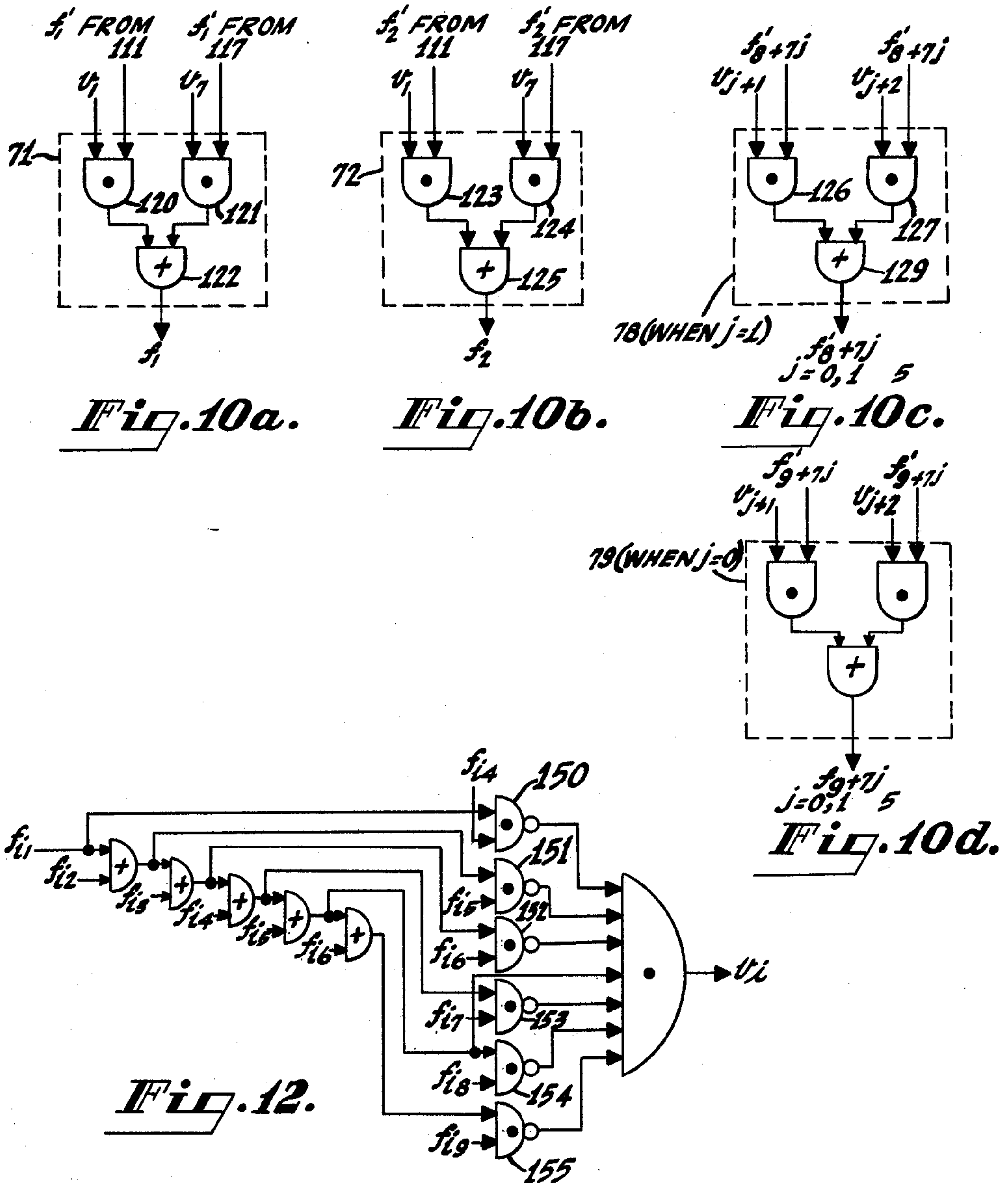
Figure 11A:
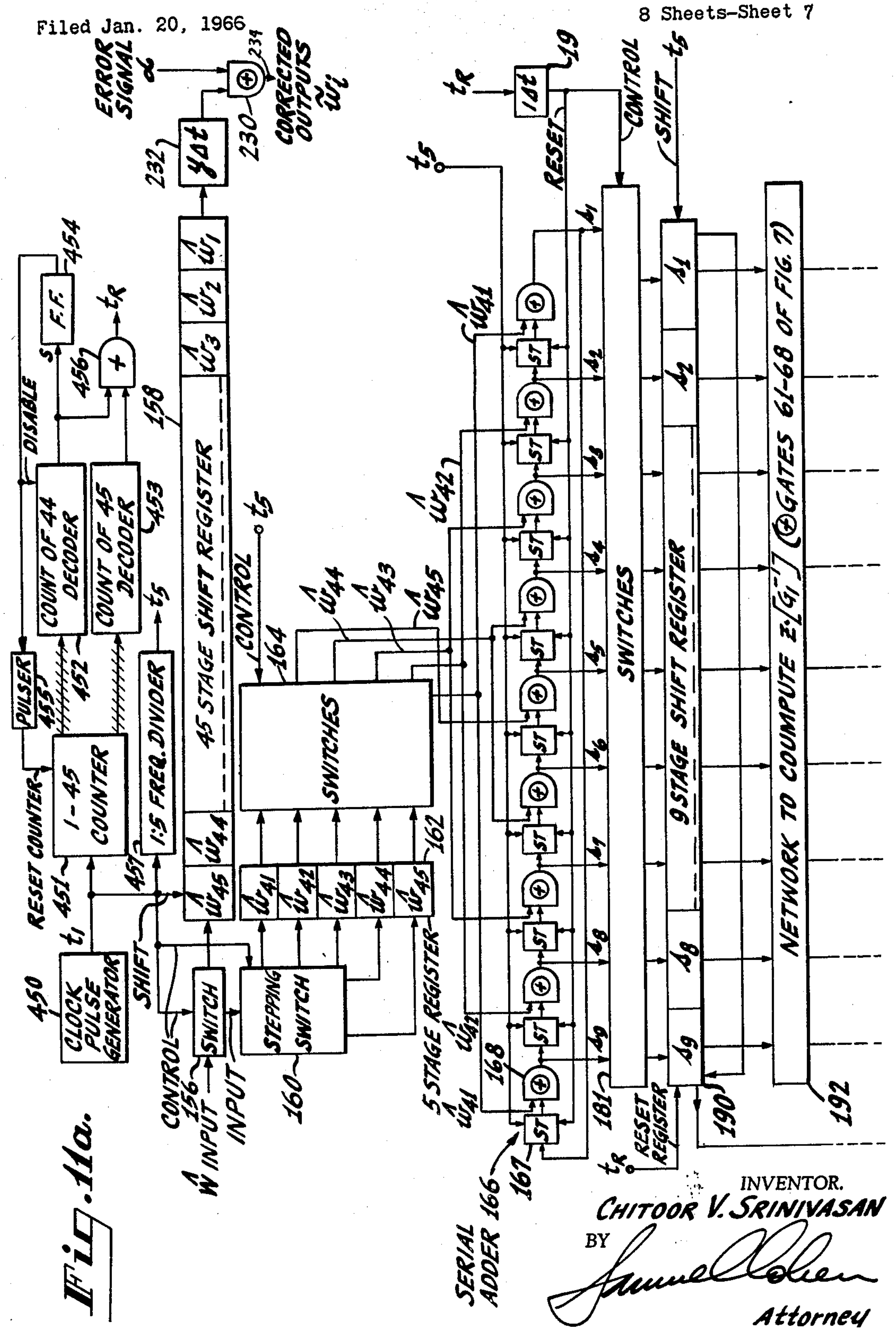
Figure 11B:
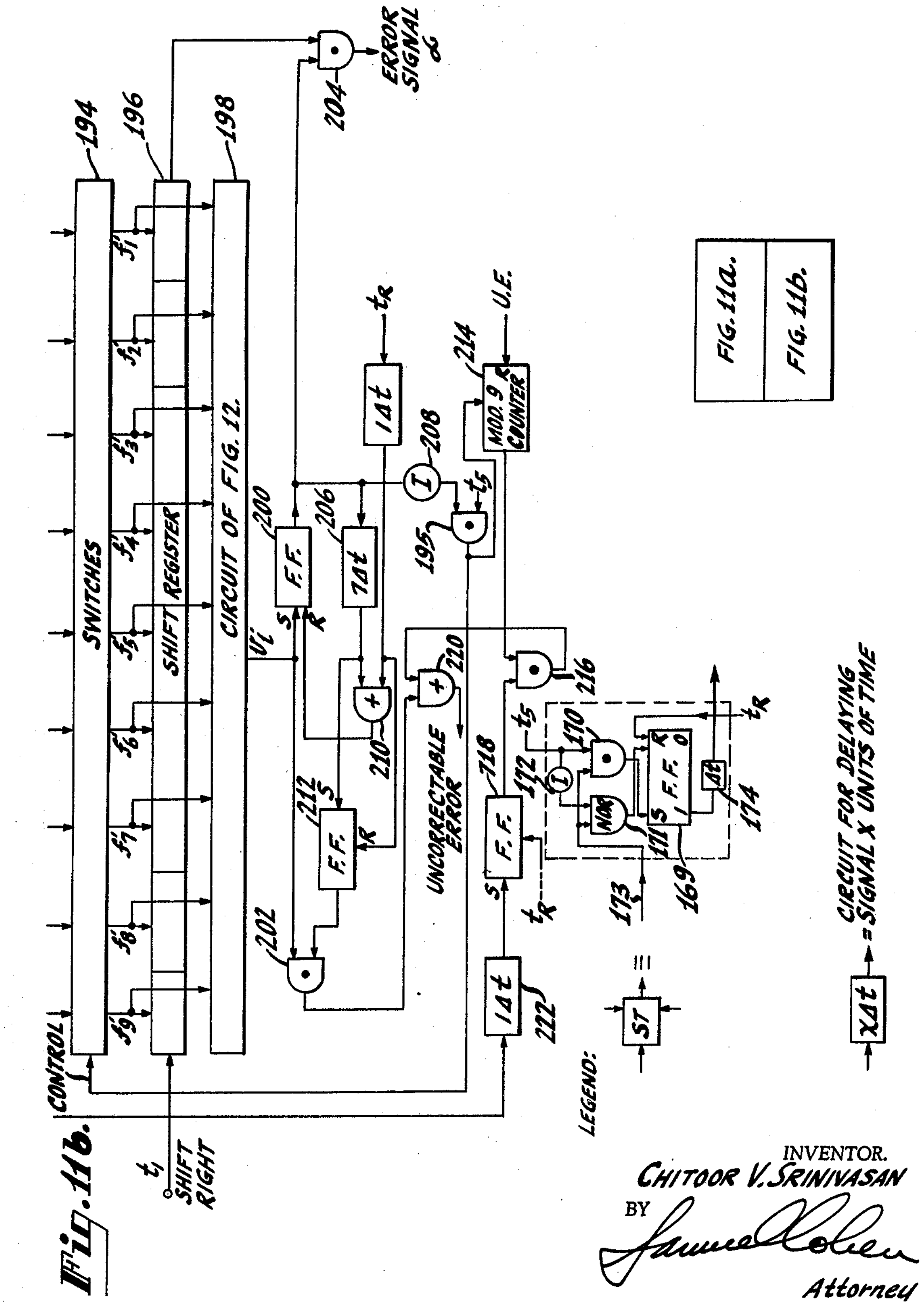

FIGURES 10*a*–10*d* show certain details of the circuit of FIGURE 7;

FIGURE 11 (on two sheets 11*a* and 11*b*) is a block circuit diagram of a system according to the invention in which the bits are transmitted and received in serial fashion; and FIGURE 12 is a more detailed showing of the circuits within block 198 of FIGURE 11.

The circuits shown in the drawing include gates to which electrical signals indicative of binary digits (bits) are applied and which produce electrical signals indicative of bits. To simplify the discussion which follows, the bits themselves are sometimes referred to rather than the signals manifesting the bits.

In the discussion of the invention below, the term "error" applied to a bit of a binary word means that the bit does not have the same value at the input and output of a data transmission or storage channel. The term "burst-error" means that the errors in a binary word occur in a sub-string of adjacent bits. If the burst-error is of length $\alpha$ this implies that no sub-string of length $\alpha-1$ includes all the errors. Finally, when it is stated that a certain code can correct burst-errors of length $\alpha$, this means that the system can correct for any one or more bits which are in error if these bits fall within a group of $\alpha$ continuous bits.

Figure 1:
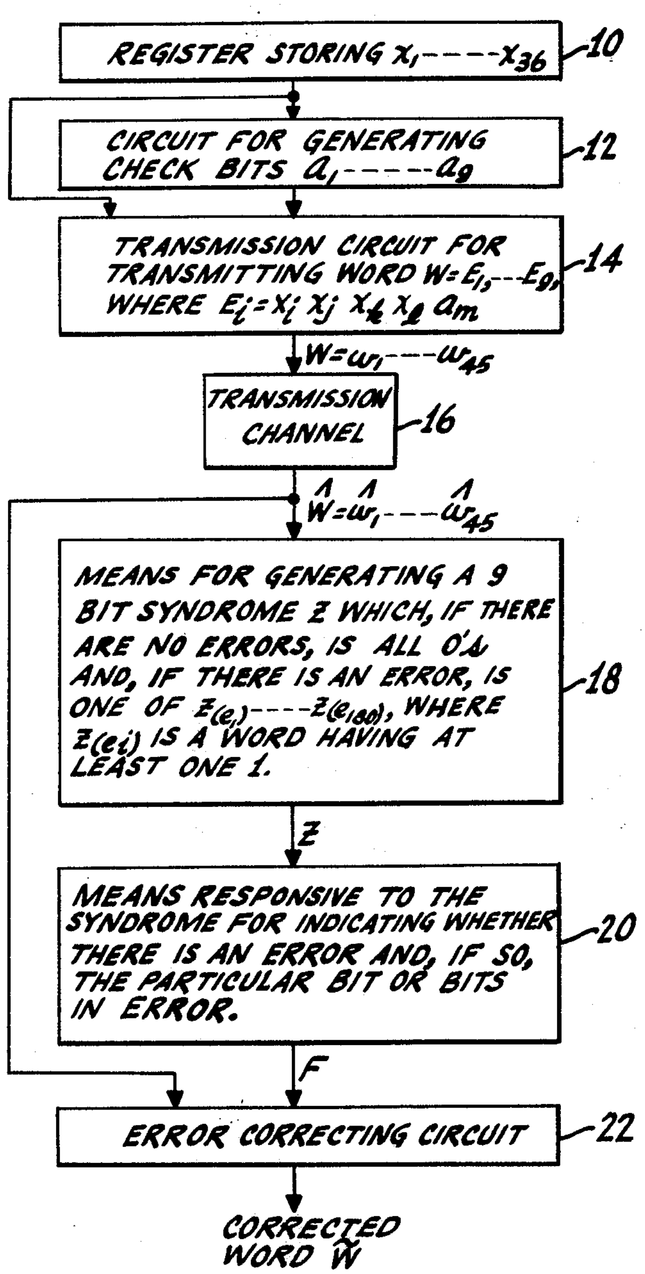
FIGURE 1 is a block circuit diagram of a system according to the invention.

The system of the present invention is illustrated in FIGURE 1. To make the explanation somewhat easier to follow, a specific example, namely a system for transmitting $n=36$ information bits $x_1, x_2 \cdots x_{36}$ is illustrated. However, this specific illustration is not to be taken as limiting the invention, as the concepts discussed herein are perfectly general. To show that this is so, a number of other examples are given later.

The system of FIGURE 1 includes a register 10 for storing the 36 information bits $x_1$–$x_{36}$. These bits are applied to a circuit 12 for generating check bits. As is discussed in more detail later, in the circuit 12 the information bits are subdivided into groups known as sub-sets S. In this particular case, there are $k=9$ sub-sets, and each sub-set has 8 bits. A check bit $a$ is generated for each such sub-set. The rules defining how bits for each sub-set are chosen are discussed later.

The check bits from circuit 12 and the information bits from circuit 10 are applied to a circuit 14 which transmits these information and check bits. The transmitted word, in this particular example, consists of 9 segments $E_1 \ldots E_9$, where each segment contains 4 information bits and 1 check bit. The four information bits are adjacent bits taken from the group $x_1$–$x_{36}$ and the check bit is chosen from among the 9 check bits in a manner to be discussed later. The transmitted word is defined as W and consists of 45 bits $w_1, w_2 \ldots w_{45}$. The letter $w$ refers either to an information bit $x$ or a check bit $a$. To give some examples, $w_1=x_1$, $w_5=a_5$, $w_6=x_5$, $w_{45}=a_4$.

The word W is transmitted via a transmission channel 16. The word may be transmitted serially and this is usually the case in a communication system. Alternatively, the transmission channel may, in fact, be a memory or the like in which case the $w$ bits may be transmitted in parallel. As a third alternative, groups of the bits, less than all, may be transmitted in parallel. For example, the word W may be transmitted segment E by segment E. The present invention is applicable to all of these types of transmission.

The word $\hat{W}$ at the output end of the transmission channel may or may not be equal to the word W which is transmitted. If the two are equal, no errors have occurred during transmission. If the two are unequal, one or more errors has occurred during transmission.

The circuit 18 includes means for comparing the information and check bits in a certain way, as discussed in detail later, and for indicating, as a result of this comparison, whether or not there are any errors in $\hat{W}$. As a result of this comparison, the means 18 generates a "syndrome" Z which is a 9 bit word. If there are no errors in W, the syndrome Z consists of all 0's. If there is an error, then the syndrome contains one or more ones and, as will be shown in detail below, the position of the 1 or 1's is indicative of the bit or bits which are in error. It should be mentioned here, as an aside, that there need not to be a one-to-one correspondence between the number of 1's in the syndrome and the number of bits in $\hat{W}$ which are in error.

The particular system illustrated in FIGURE 1 is capable of correcting for burst-errors of length $\leq 3$. It will be shown later that there are 180 such single burst-errors which are possible and therefore 180 different syndromes are capable of identifying such errors.

The syndrome Z produced by the means 18 is applied to the means 20. The latter indicates whether or not there is an error and, if there is an error, the particular bit or bits in error. The output word F produced by circuit 20 is a 45 bit word and it contains 0's in the bit positions having no errors and 1's in the bit positions having an error. For example, if the only error is in bit $\hat{w}_1$, F would be a 45 bit word starting with a 1 and following by 44 0's.

The word F and the word $\hat{W}$ are applied to an error correcting circuit 22. This circuit may simply be a modulo 2 adder and it produces a corrected word at its output which is equal to W if the burst-error which has occurred is $\leq 3$.

Check Bit Generation

As mentioned above, the information bits are grouped in $k$ sub-sets $S_1 \ldots S_k$ and a check bit is generated for each sub-set of information bits. The sub-sets $S_1 \ldots S_k$ are rows in a matrix [V] having $k$ columns and $k$ rows. The first column $V_1$ of the matrix [V] consists of information bits having the subscripts 1, 2 . . . $t$, $\lambda$, $t$ . . . 2, 1. Each succeeding $i^{th}$ column $V_1$ of the matrix consists of information bits having the subscripts $[t(i-1)+1]$, $t(i-1) \ldots (ti)$, $\lambda$, $(ti) \ldots t(i-1)$, $[t(i-1)+1]$ cyclicly shifted down through $i$ rows, where $i=1, 2 \ldots k$; $\lambda$ indicates an odd number of empty spaces; $k$ is an odd integer; and $t$ is less than $k/2$. It should also be mentioned that, by defininition, when performing a cyclic downward shift through $i$ rows, the $i$ bits which are left over are placed at the top of the column. For example, if the last bit in a column is 9 and a column is shifted down through 1 row, the 9 will appear in the first row of the shifted column.

The table for $n=36$ and $k=9$ appears below. As mentioned above, $\lambda$ in the table means that no bit is present and, in this particular case, represents only one space. (Table IX, at the end of the specification, gives an example in which $\lambda$ occupies 7 spaces in each column.) To simplify the table, only the subscripts for the information bits are shown.

TABLE I ($n=36$; $k=9$; $b=3$)

| | | | | | | | | | |
|---|---|---|---|---|---|---|---|---|---|
| $S_1$=(1 | 5 | 10 | 15 | 20 | λ | 28 | 31 | 34) |
| $S_2$=(2 | 5 | 9 | 14 | 19 | 24 | λ | 32 | 35) |
| $S_3$=(3 | 6 | 9 | 13 | 18 | 23 | 28 | λ | 36) |
| $S_4$=(4 | 7 | 10 | 13 | 17 | 22 | 27 | 32 | λ) |
| $S_5$=(λ | 8 | 11 | 14 | 17 | 21 | 26 | 31 | 36) |
| $S_6$=(4 | λ | 12 | 15 | 18 | 21 | 25 | 30 | 35) |
| $S_7$=(3 | 8 | λ | 16 | 19 | 22 | 25 | 29 | 34) |
| $S_8$=(2 | 7 | 12 | λ | 20 | 23 | 26 | 29 | 33) |
| $S_9$=(1 | 6 | 11 | 16 | λ | 24 | 27 | 30 | 33) |

Inspection of the table reveals certain properties in the sub-sets $S_1 \ldots S_9$ of bits. They are:

Property 1: A particular information bit appears only once in a sub-set.

Property 2: Each information bit appears in exactly two different sub-sets.

Property 3: No two sub-sets of information bits have more than one particular bit in common. This means that if a pair of information bits such as $x_1$ and $x_5$ appear in one sub-set, then no other sub-set includes both of these information bits. One other sub-set can and does include the information bit $x_1$; a third sub-set can and does include the information bit $x_5$.

The check bit $a_j$ for each sub-set is simply the parity bit for that sub-set. In mathematical terms, $a_j$ is the modulo 2 sum of the information bits in the sub-set $S_j$, as shown by the following equation:

$$a_j = \sum_{\{i \epsilon S_j\}} x_i, \text{ for } j=1, 2 \ldots 9 \qquad (1)$$

where: $i \epsilon S_j$ means all of the information bits within the sub-set $S_j$; and $\Sigma$ is the modulo 2 sum.

From the properties above, one may conclude that each information bit is associated with two different check bits. This is because any information bit appears in only two sub-sets of information bits and there is a check bit associated with each sub-set of information bits. The total number of different pairs of check bits which are possible is $k(k-1)/2$. This follows from the well-known permutation-combination rules which state that if there are $k$ bits, then there are $k(k-1)/2$ different combinations of pairs of bits which are possible.

The minimum value of $k$ is defined by the equation $$n = \frac{k(k-1)}{2}$$

This is simply the minimum number as, if desired, there may be more than $k$ sub-sets. The general equation therefore is $$k(k-1) \leq 2n \qquad (2)$$

If $n$ is given in the equation above, two different values of $k$ are possible. One of the values is negative and may be discarded. Another property of the present code is that each sub-set of information bits need not have the same number of such bits.

If $k$ is an odd integer and is the minimum value of $k$, then each sub-set may have $k-1$ bits.

If $b$ is the length of the maximum burst-error it is desired to correct, then $$k > 2b \qquad (3)$$

It also can be shown that $$(n+k) \cdot 2^{(b-1)} = B \qquad (4)$$

where B is the total number of burst-errors of length $\leq b$.

Figure 2:
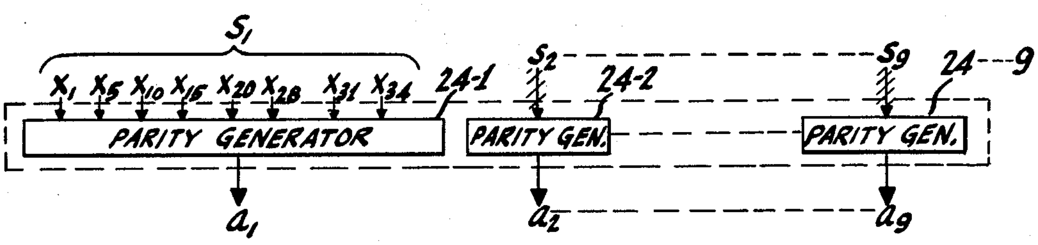
FIGURE 2 is a block circuit diagram of the check bit generating circuit of FIGURE 1.

FIGURE 2 is a block circuit diagram of the circuit for generating the check bits $a_1$, $a_9$. Each set of information bits is applied to a parity generator and the latter generates the check bit. For example, the set of bits $S_1$ is applied to parity generator 24–1 and it generates the parity bit $a_1$.$a_1$ is a 0 when there is an even number of 1's in the sub-set $S_1$ and $a_1$ is a 1 when there is an odd number of 1's in the sub-set $S_1$.

Transmission circuit 14

The circuit 14 of FIGURE 1 transmits the word W in segments $E_1$ through $E_9$. The segments are chosen from the table which has already been constructed. The first segment is chosen by reading down column 1. It contains the bits $x_1$, $x_2$, $x_3$ and $x_4$. The fifth row of column 1 is blank and the fifth bit which is transmitted is therefore a check bit. The check bit is the one associated with the particular row in which the $\lambda$ appears. In this particular case, the check bit is $a_5$. Accordingly, the first segment is $x_1$, $x_2$, $x_3$, $x_4$, $a_5$. The next segment is taken from the next column starting with the next adjacent information bit, $x_5$ in this particular case. Segment 2 therefore is $x_5, x_6, x_7, x_8, a_6$. The remaining segments are $E_3=x_9, x_{10}, x_{11}, x_{12}, a_7$; $E_4=x_{13}, x_{14}, x_{15}, x_{16}, a_8$; $E_5=x_{17}, x_{18}, x_{19}, x_{20}, a_9$; $E_6=x_{21}, x_{22}, x_{23}, x_{24}, a_1$; $E_7=x_{25}, x_{26}, x_{27}, x_{28}, a_2$; $E_8=x_{29}, x_{30}, x_{31}, x_{32}, a_3$; $E_9=x_{33}, x_{34}, x_{35}, x_{36}, a_4$.

As a general proposition, each segment E is a group of contiguous information bits $x_1 \ldots x_m$ followed by a check bit $a_p$, where $p$ for segments $1, 2 \ldots k$ are, respectively, $k+1/2, k+3/2 \ldots, k, 1, 2 \ldots, k-1/2$.

Syndrome generation

Figure 3:
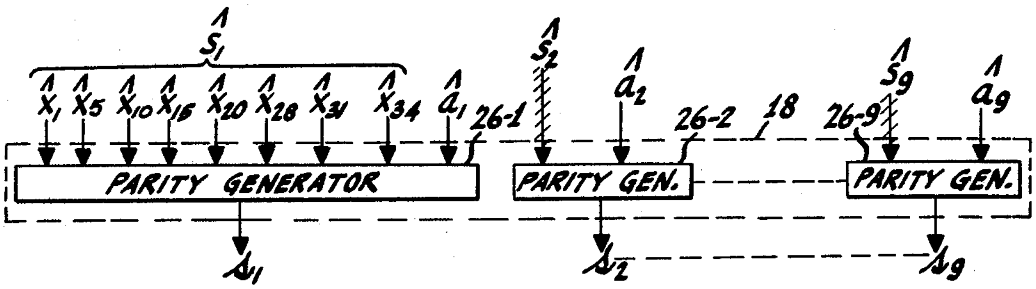
FIGURE 3, is a block circuit diagram of the syndrome generating circuit of FIGURE 1.

FIGURE 3 shows the circuit 18 for generating the syndrome Z. The circuit includes a plurality of parity generators 26–1 through 26–9. Each parity generator receives a sub-set $\hat{S}$ of information bits and the check bit $\hat{a}$ associated with that sub-set. Parity generator 26–1 receives the sub-set $S_1$ of information bits, that is, $\hat{x}_1, \hat{x}_5, \hat{x}_{10}, \hat{x}_{15}, \hat{x}_{20}, \hat{x}_{28}, \hat{x}_{31}, \hat{x}_{34}$ and the information bit $\hat{a}_1$.

If these received bits are all correct, then the syndrome bit $s_1=0$. However, if there is a single error in a received information bit belonging to $S_1$ or in the check bit $\hat{a}$ then the syndrome bit $s_1$ is a 1. The formal rules for calculating the syndrome bits $s_1$ through $s_9$ are:

The syndrome bit $s_j$ is equal to 1 when the information bit $\hat{x}_i$ is within the sub-set $S_j$ and $\hat{x}_i$ is not equal to $x_i$ or when the check bit $\hat{a}_j$ associated with $S_j$ is unequal to $a_j$. If the information bit in error is not within sub-set $S_j$ and if the check bit $a_j$ is correct, the syndrome bit $s_j$ is equal to 0.

So that the reader may more easily follow the rules above, they are applied below to a number of specific examples. First, assume that $x_1 \neq \hat{x}_1$ and all other bits of $\hat{W}$ are correct. It may be seen that $x_1$ is within sub-set $S_1$ and therefore the syndrome bit $s_1=1$. $x_1$ is not within the sub-sets $S_2 \ldots S_8$ and therefore the corresponding syndrome bits $s_2 \ldots s_8$ are all equal to 0. $x_1$ is within the sub-set $S_9$ and therefore the syndrome bit $s_9=1$.

The complete syndrome therefore for the case in which there is an error in the word $\hat{W}$ and in which that error is in $\hat{x}_1$ is: $Z(\hat{x}_1)=Z(\hat{w}_1)=100000001$. As a second example, assume that the only error in the word $\hat{W}$ is the check bit $\hat{a}_5$. In this case, only the syndrome bit $s_5$ associated with subset $S_5$ is a 1 and all other bits are 0. The syndrome therefore is $Z(a_5)=Z(\hat{w}_5)=000010000$.

It has already been stated that there can be any one of $2^{(b-1)}$ different errors within a sub-string of $b$ contiguous bits of word $\hat{W}$.

If $\hat{w}_1$ is considered to be contiguous to $\hat{w}_{45}$ then a word of length 45 can have 45 distinct sub-strings of length $b$. Thus, the total number of distinct burst-errors of length $\leq b$, for a word of length $(n+k)$ is $(n+k)2^{(b-1)}$. In the present specific example, substituting for $n$, $k$ and $b$ gives a total number of distinct burst-errors of length $\leq 3$ of 180.

The syndromes corresponding to the 45 possible errors, of length 1 are shown, in part, in Table II below. It can be shown that the remaining 135 syndromes for burst errors of length 2 and 3 are readily obtainable from this table by adding, sum modulo 2, the syndromes for the individual bits which are in error. For example, the syndrome for 2 errors, one in bit $\hat{w}_1$ and the other in bit $\hat{w}_3$ is $Z(\hat{w}_1, \hat{w}_3)=Z(\hat{w}_1)\oplus Z(\hat{w}_3)=101000101$.

The syndrome for 3 errors, one in $\hat{w}_{12}$, one in $\hat{w}_{13}$ and $\hat{w}_{14}$ is $Z(\hat{w}_{12})\oplus Z(\hat{w}_{13})\oplus Z(\hat{w}_{14})=000011111$ If one defines F as:

$$F=W\oplus\hat{W} \quad (5)$$

then the F word $f_1, f_2 \ldots f_{45}$ will have 1's in positions at which the corresponding $w$ and $\hat{w}$ bits are unequal, that is, where $w_i \neq \hat{w}_i$ and 0's in all other positions. The syndrome for an error word such as this is designated by Z(F), and is defined as $$Z(F)=Z(\hat{w}_i)\oplus Z(\hat{w}_j)\oplus \cdots Z(\hat{w}_r) \quad (6)$$

where $\hat{w}_i$, $\hat{w}_j$ and $\hat{w}_r$ are the bits in error

TABLE II ($n=36$; $k=9$)

| | | | | | | | | | | |
|---|---|---|---|---|---|---|---|---|---|---|
| $Z(\hat{x}_1)=Z(\hat{w}_1)$ | 1 | 0 | 0 | 0 | 0 | 0 | 0 | 0 | 1 | |
| $Z(\hat{x}_2)=Z(\hat{w}_2)$ | 0 | 1 | 0 | 0 | 0 | 0 | 0 | 1 | 0 | |
| $Z(\hat{x}_3)=Z(\hat{w}_3)$ | 0 | 0 | 1 | 0 | 0 | 0 | 1 | 0 | 0 | Syndromes for 1 error in Segment $E_1$ |
| $Z(\hat{x}_4)=Z(\hat{w}_4)$ | 0 | 0 | 0 | 1 | 0 | 1 | 0 | 0 | 0 | |
| $Z(\hat{a}_5)=Z(\hat{w}_5)$ | 0 | 0 | 0 | 0 | 1 | 0 | 0 | 0 | 0 | |
| $Z(\hat{x}_5)=Z(\hat{w}_6)$ | 1 | 1 | 0 | 0 | 0 | 0 | 0 | 0 | 0 | |
| $Z(\hat{x}_6)=Z(\hat{w}_7)$ | 0 | 0 | 1 | 0 | 0 | 0 | 0 | 0 | 1 | |
| $Z(\hat{x}_7)=Z(\hat{w}_8)$ | 0 | 0 | 0 | 1 | 0 | 0 | 0 | 1 | 0 | Syndromes for 1 error in Segment $E_2$ |
| $Z(\hat{x}_8)=Z(\hat{w}_9)$ | 0 | 0 | 0 | 0 | 1 | 0 | 1 | 0 | 0 | |
| $Z(\hat{a}_6)=Z(\hat{w}_{10})$ | 0 | 0 | 0 | 0 | 0 | 1 | 0 | 0 | 0 | |
| $Z(\hat{x}_9)=Z(\hat{w}_{11})$ | 0 | 1 | 1 | 0 | 0 | 0 | 0 | 0 | 0 | |
| $Z(\hat{x}_{10})=Z(\hat{w}_{11})$ | 1 | 0 | 0 | 1 | 0 | 0 | 0 | 0 | 0 | |
| $Z(\hat{x}_{11})=Z(\hat{w}_{12})$ | 0 | 0 | 0 | 0 | 1 | 0 | 0 | 0 | 1 | Syndromes for 1 error in Segment $E_3$ |
| $Z(\hat{x}_{12})=Z(\hat{w}_{13})$ | 0 | 0 | 0 | 0 | 0 | 1 | 0 | 1 | 0 | |
| $Z(\hat{a}_7)=Z(\hat{w}_{14})$ | 0 | 0 | 0 | 0 | 0 | 0 | 1 | 0 | 0 | |
| ⋮ | | | | | ⋮ | | | | | ⋮ |
| $Z(\hat{x}_{33})=Z(\hat{w}_{41})$ | 0 | 0 | 0 | 0 | 0 | 0 | 0 | 1 | 1 | |
| $Z(\hat{x}_{34})=Z(\hat{w}_{42})$ | 1 | 0 | 0 | 0 | 0 | 0 | 1 | 0 | 0 | |
| $Z(\hat{x}_{35})=Z(\hat{w}_{43})$ | 0 | 1 | 0 | 0 | 0 | 1 | 0 | 0 | 0 | Syndromes for 1 error in Segment $E_9$ |
| $Z(\hat{x}_{36})=Z(\hat{w}_{44})$ | 0 | 0 | 1 | 0 | 1 | 0 | 0 | 0 | 0 | |
| $Z(\hat{a}_4)=Z(\hat{w}_{45})$ | 0 | 0 | 0 | 1 | 0 | 0 | 0 | 0 | 0 | |

Each of the 180 syndromes is unique, that is, it is different from any of the other 179 syndromes. In the present example, it can also be shown that for any two distinct burst-errors of maximum length $b=3$, the associated syndromes Z(F) and Z(F') are also distinct.

Figure 4:
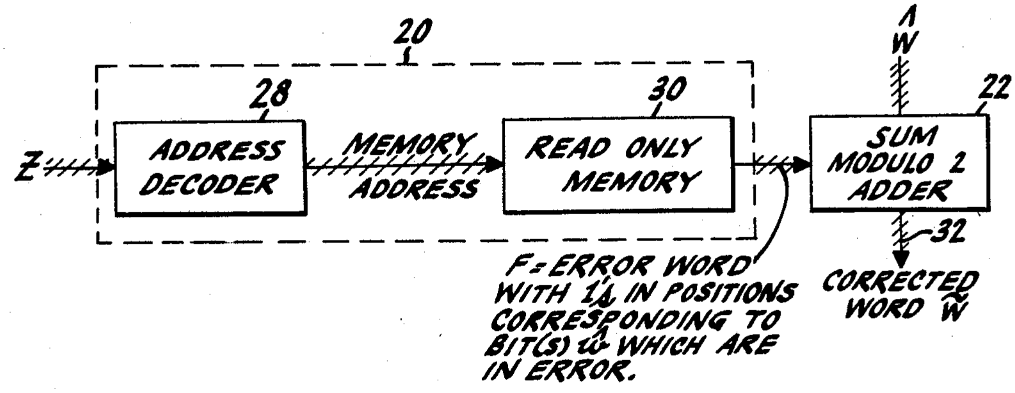
FIGURE 4 is a block circuit diagram of one embodiment of an error indicating circuit according to the invention, this circuit also being a portion of the system of FIGURE 1.
Figure 5:
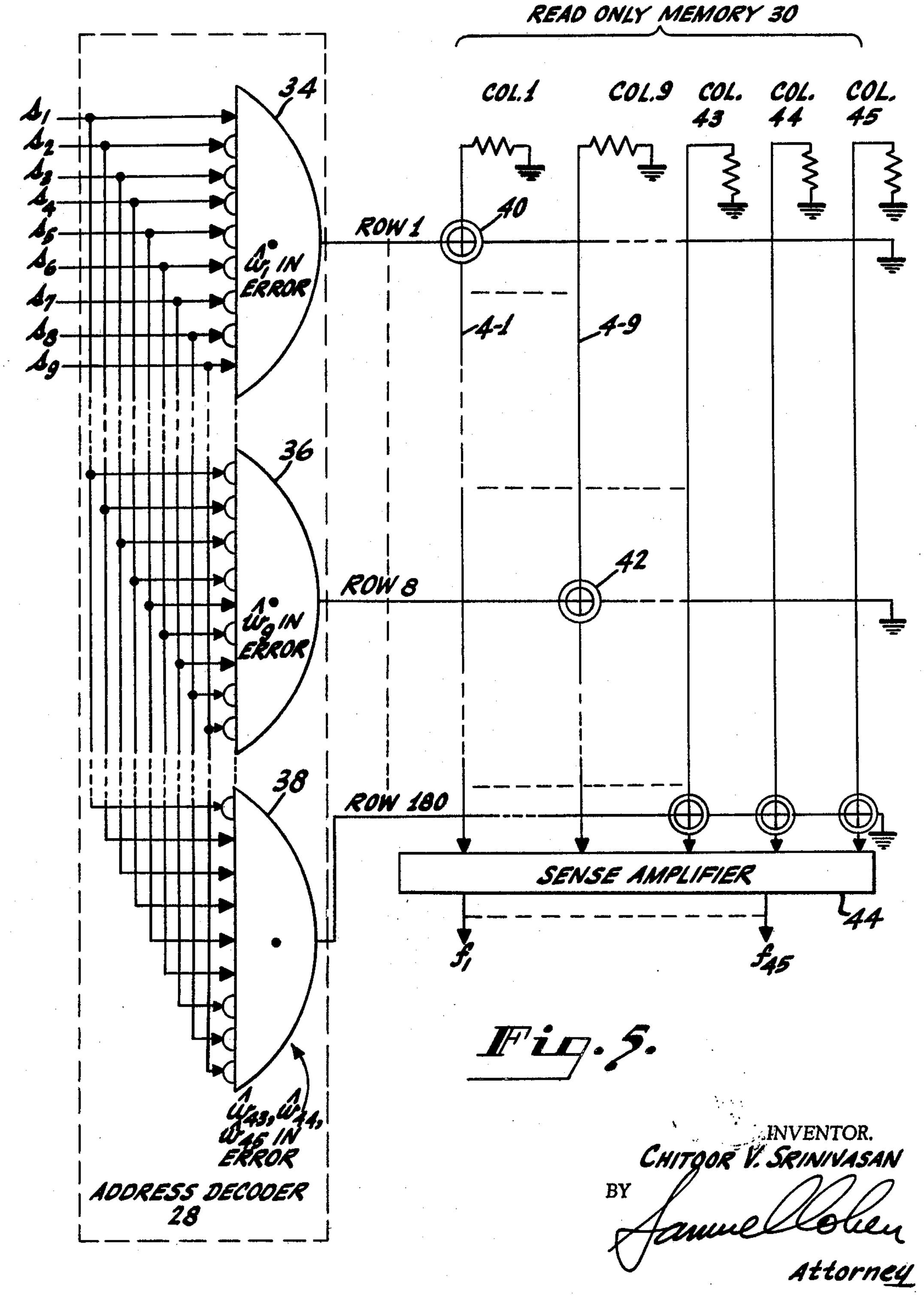
FIGURE 5 is a somewhat more detailed showing of the circuit of FIGURE 4.

Memories used for error correction (FIGS. 4, 5 and 6)

One embodiment of an error correction arrangement is shown in FIGURE 4. It includes an address decoder 28 responsive to the syndrome Z for applying an address to a read-only memory 30. In response to this address, the read-only memory produces an output 45 bit error word F which has 1's in positions corresponding to the bits $\hat{w}$ which are in error. This word F is added to the word $\hat{W}$ in the sum modulo 2 adder 22 to produce the corrected word $\tilde{W}$ at output cable 32.

A more detailed showing of a portion of the circuit of FIGURE 4 appears in FIGURE 5. The decoder may consist of 180 different decoder AND gates, three of which are shown at 34, 36 and 38. Each AND gate has a certain number of inhibit inputs indicated by half circles. The decoder AND gate 34 produces an output in response to the syndrome $Z(\hat{w}_1)$ that is, in response to the syndrome 100000001. AND gate 36 produces a 1 output in response to the syndrome $Z(\hat{w}_9)$ that is, in response to 0000101000. AND gate 38 produces a 1 output in response to $$Z(\hat{w}_{43}, \hat{w}_{44}, \hat{w}_{45}) = Z(\hat{x}_{35}, \hat{x}_{36}, \hat{a}_4) = 011111000.$$

The read-only memory 30 has 180 rows and 45 columns. A core of linear magnetic material, that is, magnetic material which does not exhibit a square hysteresis loop, is located at certain column and row intersections. For example, row 1 has a core 40 at column 1 and row 1. Thus, when gate 34 is enabled, a pulse appears on the row 1 lead and an output pulse appears at the column 1 sense winding 4–1. Under this set of conditions, the sense amplifier 44 produces an output word in which $f_1=1$ and all remaining $f$'s are 0's. In a similar manner, when gate 36 is enabled, thereby actuating core 42, a pulse appears on sense winding 4–9 and the sense amplifier produces an output $f_9=1$ and all other $f$'s are 0's. The operation of the remainder of the circuit is believed to the straightforward. In each case an output word F is produced with 1's in positions corresponding to $\hat{w}$ bits which are in error. This F word is added to the $\hat{W}$ word in the sum modulo 2 adder of FIGURE 4 to obtain the corrected word.

A modified form of circuit 20, 22 is shown in FIGURE 6. The circuit includes content-addressed memory 50 which has an address section 52 and a data section 54. The tag applied to the memory is the syndrome Z. The output produced by the data section 54 of the memory is the error word F. The modulo 2 adder 22 performs the same function as already described.

The content-addressed memory may be any one of a number which are well-known in the art. Many such memories have been described in literature.

Decoder Networks for Error Correction (FIGS. 7–10)

The two embodiments of the circuits 20 discussed above employ memories for generating the error word F. A third arrangement for performing this same function employs decoder circuits and does not require a memory. The explanation of these decoder circuits requires a brief diversion into matrix algebra.

The error word F has previously been defined as $F=f_1\ f_2 \ldots f_{45}$. The multiplication of an error bit $f_i$ by a syndrome is described by the following equation $$f_i\cdot(s_1, s_2 \ldots s_k)=f_i\cdot s_1, f_i\cdot s_2 \ldots f_i\cdot s_k \qquad (8)$$

The multiplication above may be defined in still another way. If the matrix of Table II is represented by [H] then $$F\cdot[H]=\sum_{i=1}^{i=n+k} f_i\cdot Z(\hat{w}_i) \qquad (9)$$

The meaning of Equation 9 above can perhaps best be illustrated by a specific example. Assume that the first and second bits $\hat{w}_1$ and $\hat{w}_2$ are both in error. In this case $f_1$ and $f_2$ are both 1 and all other remaining bits of F are 0. Therefore, $F\cdot[H]$ is = one times the syndrome $Z(w_1)$ (this syndrome appears on line 1 of the matrix [H]) added sum modulo 2 to one times the syndrome $Z(w_2)$ (this syndrome appears on line 2 of the matrix [H]).

The example above may be expressed in terms of mathematical symbols in the following way:

$$\begin{aligned} F\cdot[H] &= 1\cdot Z(w_1)\oplus 1\cdot Z(w_2) \\ &= 100000001 \\ &\oplus 010000010 \\ &= 110000011 \end{aligned}$$

It follows from the example above that Equation 9 may be rewritten as:

$$F\cdot[H]=Z(F) \qquad (10)$$

It has already been stated that in the present system the burst-errors to be corrected are of a certain specific length, namely $\leq 3$. Thus, the only syndromes of interest in the present application are the result of a summation of three or less adjacent rows of the matrix [H].

There will now be considered, all of the possible burst-errors of length $\leq 3$, beginning in the first seven bits of $\hat{W}$, namely, $(\hat{x}_1, \hat{x}_2, \hat{x}_3, \hat{x}_4, \hat{a}_5, \hat{x}_5$, or $\hat{x}_6)$.

A burst-error beginning at the last bit $\hat{x}_6$ scans the digits $(\hat{x}_6, \hat{x}_7, \hat{x}_8)$ and none of the bursts of length $\leq 3$ which begin at bits to the left of $\hat{x}_6$ can scan any digit to the right of $\hat{x}_8$ Thus, for an errors beginning in one of the first seven digits of $\hat{W}$ all of the possible syndromes of interest are obtainable from summation among the first nine rows of the matrix [H]. To correct these burst-errors therefore, it is only necessary to consider the sub-matrix of [H] consisting of the first 9 rows of [H]. As will be seen shortly, a sub-matrix of this type has been chosen because it is a square array (9 rows and 9 columns) and such arrays have special properties. This sub-matrix is hereafter identified by $[G_1]$ and it appears as Table III below.

TABLE III $$\begin{bmatrix} Z(\hat{w}_1) \\ Z(\hat{w}_2) \\ Z(\hat{w}_3) \\ Z(\hat{w}_4) \\ Z(\hat{w}_5) \\ Z(\hat{w}_6) \\ Z(\hat{w}_7) \\ Z(\hat{w}_8) \\ Z(\hat{w}_9) \end{bmatrix} = \begin{bmatrix} 1&0&0&0&0&0&0&0&1 \\ 0&1&0&0&0&0&0&1&0 \\ 0&0&1&0&0&0&1&0&0 \\ 0&0&0&1&0&1&0&0&0 \\ 0&0&0&0&1&0&0&0&0 \\ 1&1&0&0&0&0&0&0&0 \\ 0&0&1&0&0&0&0&0&1 \\ 0&0&0&1&0&0&0&1&0 \\ 0&0&0&0&1&0&1&0&0 \end{bmatrix} = [G_1] \qquad (11)$$

The first 9 digits $f_1, f_2 \ldots f_9$ of the error word F are designated by the symbol $F_\alpha$. Assuming that there are no errors in any of the bits $\hat{w}_{10}$ through $\hat{w}_{45}$ Equation 10 may be rewritten as $$F\cdot[H]=F_\alpha\cdot[G_1]=Z(F) \qquad (12)$$

Before continuing further, it is necessary to consider another type of matrix known as a unit matrix. This matrix, identified by [I] appears as Table IV below.

TABLE IV $$\begin{bmatrix} 1&0&0&0&0&0&0&0&0 \\ 0&1&0&0&0&0&0&0&0 \\ 0&0&1&0&0&0&0&0&0 \\ 0&0&0&1&0&0&0&0&0 \\ 0&0&0&0&1&0&0&0&0 \\ 0&0&0&0&0&1&0&0&0 \\ 0&0&0&0&0&0&1&0&0 \\ 0&0&0&0&0&0&0&1&0 \\ 0&0&0&0&0&0&0&0&1 \end{bmatrix} = [I] \qquad (13)$$

It can be shown that for any error word $F_a$:

$$F_a \cdot [I] = F_a \qquad (14)$$

One can derive from the matrix $[G_1]$ and the matrix $[I]$ a third type of matrix $[G_1]^{-1}$ known as the inverse of $[G_1]$. It is known from the theory of matrices that such an inverse matrix can be found uniquely in the case of square matrices like $[G_1]$ provided the square matrices satisfy a certain property known as "non-singularity." It is sufficient for purposes of this present application, to know that $[G_1]$ is non-singular and for matrices like $[G_1]$ there are well defined ways of finding the inverse matrix $[G_1]^{-1}$. (Any basic text on the subject shows how this may be done.)

The inverse matrix $[G_1]^{-1}$ appears as Table V below.

TABLE V $$\begin{bmatrix} 1&0&1&0&1&0&1&0&1 \\ 1&0&1&0&1&1&1&0&1 \\ 0&0&1&0&1&0&0&0&1 \\ 1&1&1&0&1&1&1&1&1 \\ 0&0&0&0&1&0&0&0&0 \\ 1&1&1&1&1&1&1&1&1 \\ 0&0&0&0&1&0&0&0&0 \\ 1&1&1&0&1&1&1&0&1 \\ 0&0&1&0&1&0&1&0&1 \end{bmatrix} = [G_1]^{-1} \qquad (14a)$$

The multiplication of the matrix $[G_1]$ by its inverse $[G_1]^{-1}$ is defined as follows:

$$[G_1]\cdot[G_1]^{-1} = \begin{Bmatrix} Z(w_1)\cdot[G_1]^{-1} \\ Z(w_2)\cdot[G_1]^{-1} \\ \vdots \\ Z(w_9)\cdot[G_1]^{-1} \end{Bmatrix} = [I] \qquad (15)$$

Equation 12 may be multiplied by $[G_1]^{-1}$ to obtain:

$$F_a[G_1][G_1]^{-1} = Z(F)\cdot[G_1]^{-1} \qquad (16)$$

Substituting [I] for $[G_1]\cdot[G_1]^{-1}$ (see Equation 15) in the left side of Equation 16 and equating this to the left side of Equation 16 gives $$F_a[G_1]\cdot[G_1]^{-1} = F_a\cdot[I] \qquad (17)$$

The following equation may now be derived from Equations 16 and 17:

$$Z(F)\cdot[G_1]^{-1} = F_a\cdot[I] \qquad (18)$$

Substituting $F_a$ for $F_a\cdot[I]$ (see Equation 14) gives:

$$Z(F)\cdot[G_1]^{-1} = F_a \qquad (19)$$

Equation 19 describes the decoding scheme of interest. It states that when the syndrome for a particular error is obtained and multiplied by the inverse matrix $[G_1]^{-1}$, then an error word $F_a$ is obtained (the same error word $F_a$ as appears in F of FIGURE 1) which has 1's in the positions corresponding to the bits which are in error and 0's in all other positions.

To help the reader better to understand what Equation 19 means, the following specific example is given. It may be assumed that the only bits in the received word which are in error are $$\hat{w}_2 \text{ and } \hat{w}_3$$

In this case:

$$F_a = Z(F)\cdot[G_1]^{-1} = Z(w_2)[G_1]^{-1} \oplus Z(w_3)[G_1]^{-1}$$

The above equations says that the second and eighth rows of the inverse matrix $[G_1]^{-1}$ are added, sum modulo 2 (the carries are discarded) and the third and seventh rows of the inverse matrix $[G_1]^{-1}$ are also added, sum modulo 2, also discarding the carries, and then the two sums which are obtained are added, sum modulo 2. The complete solution of the problem appears below $$F_\alpha = (010000010)[G_1]^{-1} \oplus (001000100)[G_1]^{-1}$$

$$\begin{array}{rl} =101011101 & \text{(Row 2)} \\ \oplus 111011101 & \text{(Row 8)} \\ \hline 01000000 = F_2 & \\ & \\ 001010001 & \text{(Row 3)} \\ \oplus 000010001 & \text{(Row 7)} \\ \hline 001000000 = F_3 & \end{array}$$

$$F_2 \oplus F_3 = 01100000 = F_\alpha$$

It can be seen from the above and from Equation 19 that each bit $f_i$ making up $F_a$ is the modulo 2 sum of the bits in the column $i$ of $Z(w_i)\cdot[G_1]^{-1}$. In the specific example given, in which there are two and only two bits in error, namely in bits $w_2$ and $w_3$:

$f_1 = 1\oplus1\oplus0\oplus0 = 0$ (addition of bits in col. 1)
$f_2 = 0\oplus1\oplus0\oplus0 = 1$ (addition of bits in col. 2)
$f_3 = 1\oplus1\oplus1\oplus0 = 1$ (addition of bits in col. 3)
$f_4 = 0\oplus0\oplus0\oplus0 = 0$ (addition of bits in col. 4)

and so on.

In more general terms, expansion of the term $Z(F)\cdot[G_1]^{-1}$ of Equation 19 gives:

$$\begin{array}{lcccccccccccccccccc} s_1(1 & 0 & 1 & 0 & 1 & 0 & 1 & 0 & 1) = & s_1 & 0 & s_1 & 0 & s_1 & 0 & s_1 & 0 & s_1 \\ \oplus s_2(1 & 0 & 1 & 0 & 1 & 1 & 1 & 0 & 1) = \oplus & s_2 & 0 & s_2 & 0 & s_2 & s_2 & s_2 & 0 & s_2 \\ \oplus s_3(0 & 0 & 1 & 0 & 1 & 0 & 0 & 0 & 1) = \oplus & 0 & 0 & s_3 & 0 & s_3 & 0 & 0 & 0 & s_3 \\ \oplus s_4(1 & 1 & 1 & 0 & 1 & 1 & 1 & 1 & 1) = \oplus & s_4 & s_4 & s_4 & 0 & s_4 & s_4 & s_4 & s_4 & s_4 \\ \oplus s_5(0 & 0 & 0 & 0 & 1 & 0 & 0 & 0 & 0) = \oplus & 0 & 0 & 0 & 0 & s_5 & 0 & 0 & 0 & 0 \\ \oplus s_6(1 & 1 & 1 & 1 & 1 & 1 & 1 & 1 & 1) = \oplus & s_6 & s_6 & s_6 & s_6 & s_6 & s_6 & s_6 & s_6 & s_6 \\ \oplus s_7(0 & 0 & 0 & 0 & 1 & 0 & 0 & 0 & 1) = \oplus & 0 & 0 & 0 & 0 & s_7 & 0 & 0 & 0 & s_7 \\ \oplus s_8(1 & 1 & 1 & 0 & 1 & 1 & 1 & 0 & 1) = \oplus & s_8 & s_8 & s_8 & 0 & s_8 & s_8 & s_8 & 0 & s_8 \\ \oplus s_9(0 & 0 & 1 & 0 & 1 & 0 & 1 & 0 & 1) = \oplus & 0 & 0 & s_9 & 0 & s_9 & 0 & s_9 & 0 & s_9 \end{array}$$

The right hand side of the expressions above represent modulo 2 addition, where the addition is carried through along the various columns independently of each other, that is, with any carries which occur discarded rather than being applied to the next column. Addition of the 9 right hand columns provides the following 9 equations, where $f_1$ is a result of the addition of column 1, $f_2$ is a result of the addition of column 2 and so on.

$$f_1 = s_1\oplus s_2\oplus s_4\oplus s_6\oplus s_8 \qquad (20)$$
$$f_2 = s_4\oplus s_6\oplus s_8 \qquad (21)$$
$$f_3 = s_1\oplus s_2\oplus s_3\oplus s_4\oplus s_6\oplus s_8\oplus s_9 \qquad (22)$$
$$f_4 = s_6 \qquad (23)$$
$$f_5 = s_1\oplus s_2\oplus s_3\oplus s_4\oplus s_6\oplus s_7\oplus s_8\oplus s_9 \qquad (24)$$
$$f_6 = s_2\oplus s_4\oplus s_6\oplus_8 \qquad (25)$$
$$f_7 = s_1\oplus s_2\oplus s_4\oplus s_6\oplus s_8\oplus s_9 \qquad (26)$$
$$f_8 = s_4\oplus s_6 \qquad (27)$$
$$f_9 = s_1\oplus s_2\oplus s_3\oplus s_4\oplus s_5\oplus s_7\oplus s_8\oplus s_9 \qquad (28)$$

Equations 20 to 28 are valid only when the bits $$\hat{w}_{10} \ldots \hat{w}_{45}$$

of the transmitted word are all correct and when any error or burst-errors which may be present do not extend beyond the first nine bits $$\hat{w}_1 \ldots \hat{w}_9$$

However, in the most general case, this assumption may not be in order. The general equation covering errors in any of the $w$ bits is $$Z(F)\cdot[G_1]^{-1}=F_{a'}=f_{1'}, f_{2'} \ldots f_{9'} \quad (29)$$

where $F_a'=F_a$ only when the bits $$\hat{w}_{10}\ldots\hat{w}_{45} \text{ are correct}$$

The circuit for implementing Equations 20–28 above is shown in FIGURE 7. It includes the EXCLUSIVE OR gates 61–68, respectively, and gates 71–79, respectively. (For purposes of the present simplified explanation, all of the gates 71–79, respectively are shown as AND. In practice, the first and second gates 71 and 72 and the eighth and ninth gates 78 and 79 are each a group of three gates (two AND gates followed by an OR gate) as will be discussed later in connection with 9 and 10.) The EXCLUSIVE OR gate receive the syndrome bits, as shown, and produce the error bits, as shown. Since the error bit $f_{4'}$ is equal to the syndrome bit $s_6$ (see Equation 23), no EXCLUSIVE OR gate is needed for the production of the former bit.

It readily can be shown that the EXCLUSIVE OR gates do operate in the manner defined by the equations. One or two examples should suffice for the explanation. EXCLUSIVE OR gate 61 produces an output $s_1\oplus f_6'$ is equal to $s_2\oplus s_4\oplus s_6\oplus s_8$. Therefore, the EXCLUSIVE OR gate 61 produces the output $f_{1'}=s_2\oplus s_4\oplus s_6\oplus s_8$ as desired (see Equation 20).

EXCLUSIVE OR gate 62 produces an output $f_2'=s_8\oplus f_{8'}$. *As* $f_{8'}$ is equal to $s_4\oplus s_6$, $f_2'=s_4\oplus s_6\oplus s_8$, as required (see Equation 21).

As a last example, EXCLUSIVE OR gate 65 produces an output $s_2\oplus f_{2'}$. As $f_{2'}=s_4\oplus s_6\oplus s_8$, $f_6'=s_2\oplus s_4\oplus s_6\oplus s_8$, as required (see Equation 25).

The bits $f_1'\ldots f_9'$ are applied to AND gates 71 . . . 79, respectively. The second input to each AND gate is the bit $v_1$ which is produced by the circuit of FIGURE 8. This circuit will be discussed in more detail shortly. Suffice it to say, for the present, that $v_1=1$ when there is an error of length $\leq 3$, that is, a correctable error, in the received bits $w_1\ldots w_9$. Under these circumstances, the AND gates are primed and, if a bit $f'$ is a 1, it passes through the AND gate as a 1. On the other hand, if the $f'$ bit is a 0, a 0 appears at the output of the AND gate.

If there is no error which extends beyond the first 9 information bits $w_1\ldots w_9$, then $v_1$ is a 0. However, under these conditions, $f_1'\ldots f_9'$ are also all 0's so that the adder 22 does receive all 0's, as desired.

If there is an uncorrectable error as, for example, a burst-error of length $>3$ which extends beyond the first 9 bits $$\hat{W}_{1-9}=\hat{w}_1\ldots\hat{w}_9$$

then $v_1$ is a 0. Under these circumstances, the $f$ bits applied to the modulo 2 adder 22 are all 0 and $$\text{the word } \hat{W}_{1-9}$$

is uncorrected. This is a desired mode of operation as, if the error which occurs is uncorrectable, there does not appear to be any point in attempting, at least with the present system, to insert some correction.

Figure 8:
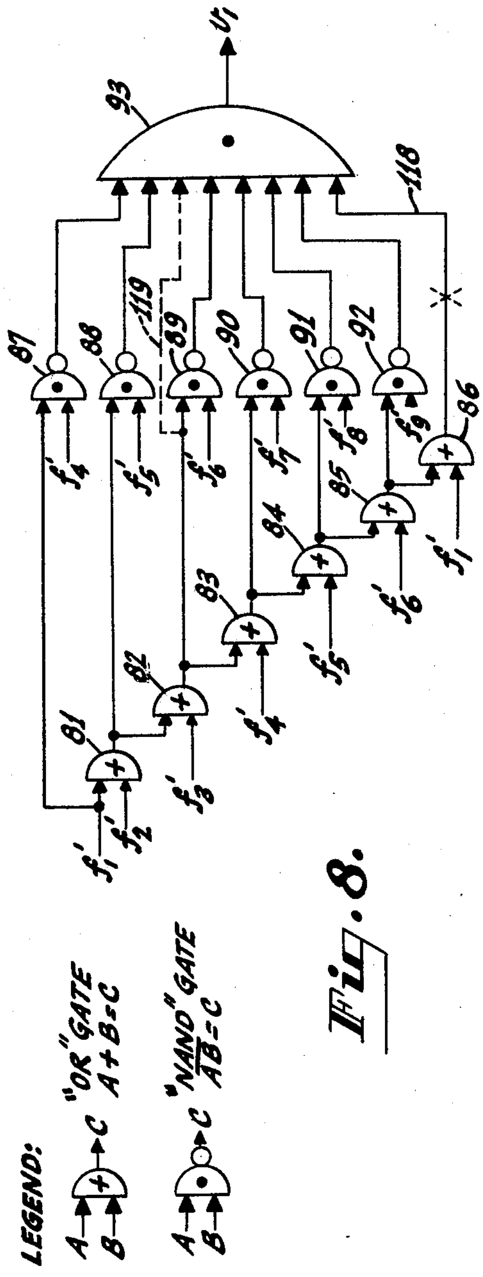

The circuit for generating $v_1$ shown in FIGURE 8 includes 6 OR gates 81 through 86 inclusive, 6 AND gates 87 through 92 inclusive, and an AND gate 93. The interconnection among the various gates is such that $v_1$ is a 1 when there is a correctable error, that is, a burst-error of length $$\leq 3 \text{ among the first seven digits of } \hat{W}$$

and a 0 at all other times.

The operation of the circuit of FIGURE 8 can be understood by considering a few examples. In the first example, there are no errors, that is $f_1'\ldots f_9'$ are all 0. The last OR gate 86, under these conditions, produces an output 0. This 0 is an input to AND gate 93 so that the AND gate produces an output $v_1=0$.

As a second example, assume that there is a burst-error of length 3 and that this burst-error causes the error bits $f_3'$, $f_4'$ and $f_5'$ all to be 1. Under this set of conditions, OR gates 82, 83, 84, 85, and 86 all produce a 1 output. $f_1'$ is a 0 so that NAND gate 87 produces a 1 output. $f_1'$ and $f_2'$ are both 0 so that OR gate 81 produces a 0. This 0 output is one of the inputs to NAND gate 88 so that the latter produces a 1 ouptput. $f_6'$, an input to NAND gate 89, is a 0 so that the latter gate produces a 1 output. $f_7'$, and input to NAND gate 90 is a 0 so that the latter gate produces a 1 output. $f_8'$, an input NAND gate 91, is a 0 so that NAND gate 91 produces a 1 output. $f_9'$, an input to NAND gate 92, is a 0 so that the latter produces a 1 output. Accordingly, all of the inputs to AND gate 93 are 1 so that $v_1$ is a 1.

Assume now that there is a burst-error of length $>3$ and assume that, for example, this burst-error occurs in the bits $$\hat{w}_1\ldots\hat{w}$$

corresponding to $f_1'=f_2'=f_3'=f_4'=1$. As $f_1'$ and $f_4'$ are both 1, NAND gate 87 produces a 0 output. This disables AND gate 93 and it produces an output $v_1=0$.

In the discussion of the circuit of FIGURE 7, the assumption has been made that any correction burst-error does not extend beyond $$\text{the ninth bit } \hat{w}_9$$

Now the case will be considered in which the burst-error of length $\leq 3$ extends beyond the first nine bits. As a specific example, assume that the burst-error occurs in bits $$\hat{w}_8,\ \hat{w}_9,\ \hat{w}_{10}$$

To identify such errors another matrix must be drawn which includes rows having a syndrome corresponding, for example, to errors in bit $w_8$, $w_9$ and $w_{10}$. Moreover, for present purposes, it is preferred to employ a square matrix. Such a matrix legended $[G_2]$ appears below and the inverse of this matrix $[G_2]^{-1}$ also appears below. The matrix $[G_2]$ consists of rows 8, 9 . . . 16 of the matrix [H]. The corresponding inverse matrix $[G]^{-1}$ is derived from the matrix $G_2$ in the same way as the inverse matrix $[G_1]^{-1}$ is derived from the matrix $[G_1]$.

With the information above available, a network for implementing the equation $Z\cdot[G_2]^{-1}$ may be derived. This network consisting of a group of EXCLUSIVE OR gates analogous to EXCLUSIVE OR gates 68 of FIGURE 7 but arranged to satisfy the terms of the equation $Z\cdot[G_2]^{-1}$.

In a manner similar to the above, additional networks are formed making use of the other [G] matrices and their inverses, all of these matrices being listed below as Table VI.

TABLE VI $$[\text{Rows 1 to 9 of } [H]=[Q_1]=\begin{bmatrix}100000001\\010000010\\001000100\\000101000\\000010000\\110000000\\001000001\\000100010\\000010100\end{bmatrix} \quad [G_1]^{-1}=\begin{bmatrix}101010101\\101011101\\001010001\\111011111\\000010000\\111111111\\000010001\\111011101\\001010101\end{bmatrix}$$

$$[\text{Rows 8 to 16 of } [H]=[G_2]=\begin{bmatrix}000100010\\000010100\\000001000\\011000000\\100100000\\000010001\\000001010\\000000100\\001100000\end{bmatrix} \quad [G_2{}^{-1}]=\begin{bmatrix}101010100\\101100101\\101000101\\101000100\\010000010\\001000000\\000000010\\001000100\\010001010\end{bmatrix}$$

$$[\text{Rows 15 to 23 of } [H]=[G_3]=\begin{bmatrix}000000100\\001100000\\010010000\\100001000\\000000101\\000000010\\000110000\\001001000\\010000100\end{bmatrix} \quad [G_3]^{-1}=\begin{bmatrix}111100111\\100000001\\111000101\\101000101\\101000001\\111000111\\100000000\\000001000\\100010000\end{bmatrix}$$

TABLE VI—Continued $$[\text{Rows 22 to 30 of } [H] = [G_4] = \begin{bmatrix} 001001000 \\ 010000100 \\ 100000010 \\ 000000001 \\ 000011000 \\ 000100100 \\ 001000010 \\ 010000001 \\ 100000000 \end{bmatrix} \quad [G_4]^{-1} = \begin{bmatrix} 000000001 \\ 000100010 \\ 001000101 \\ 010101010 \\ 101010101 \\ 101000101 \\ 010100010 \\ 001000001 \\ 000100000 \end{bmatrix}$$

$$[\text{Rows 29 to 37 of } [H] = [G_5] = \begin{bmatrix} 010000001 \\ 100000000 \\ 000001100 \\ 000010010 \\ 000100001 \\ 101000000 \\ 010000000 \\ 000000110 \\ 000001001 \end{bmatrix} \quad [G_5]^{-1} = \begin{bmatrix} 010000000 \\ 000000100 \\ 010001000 \\ 100010100 \\ 101100111 \\ 100000101 \\ 101000101 \\ 101000111 \\ 100000100 \end{bmatrix}$$

$$[\text{Rows 36 to 44 of } [H] = [G_6] = \begin{bmatrix} 000000110 \\ 000001001 \\ 100010000 \\ 010100000 \\ 001000000 \\ 000000011 \\ 100000100 \\ 010001000 \\ 001010000 \end{bmatrix} \quad [G_6]^{-1} = \begin{bmatrix} 001010001 \\ 111011111 \\ 000010000 \\ 111111111 \\ 000010001 \\ 111011101 \\ 001010101 \\ 101010101 \\ 101011101 \end{bmatrix}$$

$$[\text{Rows 43 to 6 of } [H] = [G_7] = \begin{bmatrix} 010001000 \\ 001010000 \\ 000100000 \\ 100000001 \\ 010000010 \\ 001000100 \\ 000101000 \\ 000010000 \\ 110000000 \end{bmatrix} \quad [G_7]^{-1} = \begin{bmatrix} 101000101 \\ 101000100 \\ 010000010 \\ 001000000 \\ 000000010 \\ 001000100 \\ 010001010 \\ 101010100 \\ 101100101 \end{bmatrix}$$

Figure 9:
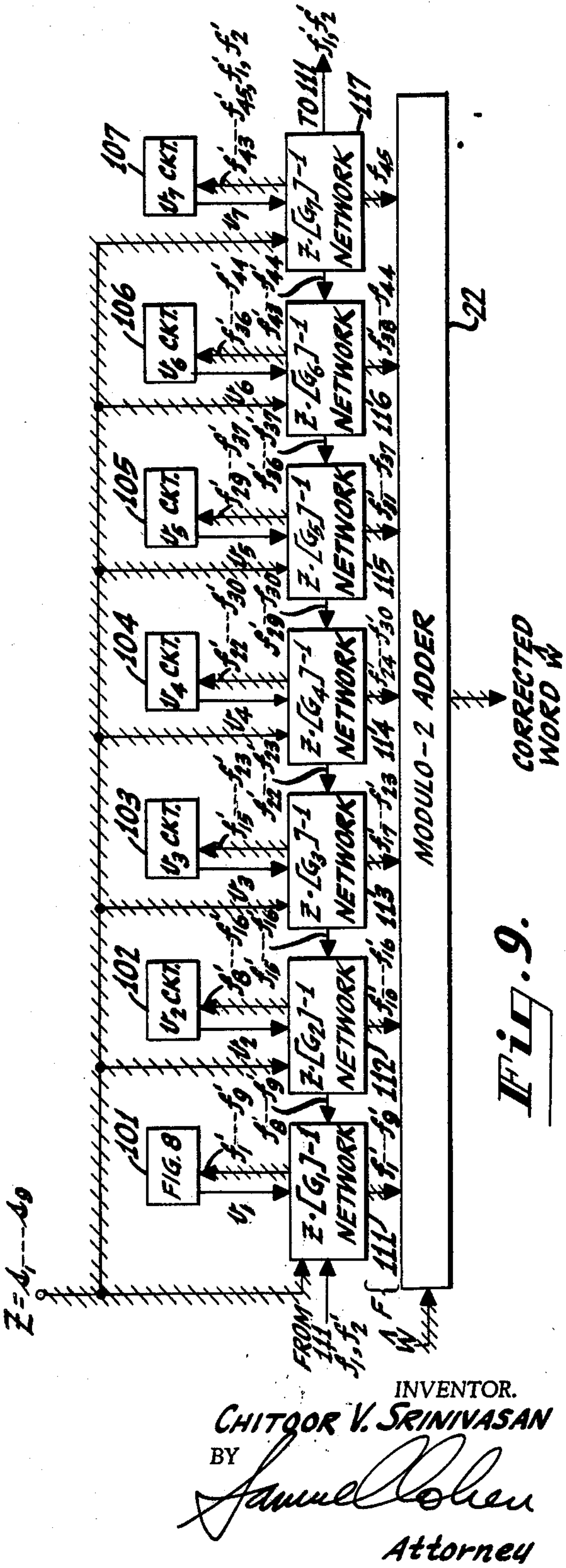

FIGURE 9 illustrates the complete decoder system employed to implement the block 20 of FIGURE 1. There are seven circuits 101–107 for generating the seven $v$ bits $v_1 \ldots v_7$, respectively. There are seven networks, shown at 111 through 117, respectively, for solving the equation $Z \cdot [G_i]^{-1}$ where $i=1, 2 \ldots 7$. The circuit 101 is the circuit of FIGURE 8. The circuits 102–106 are essentially identical with the circuit of FIGURE 8, however, with different error bits $f_i'$ applied. For example, in the circuit 102 for $v_2$ the error bits $f_8'$ and $f_9'$ are applied to OR gate 81 rather than the bits $f_1'$ and $f_2'$. The bit $f_{16}'$ is applied to NAND gate 92 rather than the bit $f_9'$ and so on. Similar substitutions are made in the other circuits.

The $v_7$ circuit 107 is similar to the circuit of FIGURE 8 with two minor modifications. The line 118 is deleted and the dashed line 119 is added.

The network 111 is the network of FIGURE 7 with some modifications in the gates 71–79. Rather than employing a single AND gate 71 for the first gate, the gates of FIGURE 10*a* are used. The gate 120 receives the bits $v_1$ and the bit $f_1'$ from network 111, that is, from the EXCLUSIVE OR gate 61 (FIGURE 7) within network 111. If there is a burst-error of length $\leq 3$ that begins with $f_1'$, then gate 120 will produce an output $f_1$. This is the operation desired.

It may be that $\hat{w}_1$ is an error but that this error is part of a burst that begins with the last bit $\hat{w}_{45}$ or with the next to the last bit $\hat{w}_{44}$ of the word $\hat{W}$ In this case, the last network 117 of FIGURE 9 will correct for the error. The network 117 applies its $f'$ bits to the $v_7$ circuit 107 and the latter, in this case, generates an output $v_7=1$. This signal $v_7$ and the $f_1'$ bit generated in network 117 are applied to AND gate 121. Thus, AND gate 121 serves to correct any burst-error of correctable length which extends from bit $\hat{w}_{44}$ or $\hat{w}_{45}$ to $\hat{w}_1$ The outputs of AND gates 120 and 121 are applied through OR gate 122 to the modulo 2 adder 22. This bit is the bit $f_1$.

The second gate, corresponding to 72 of the network 117, is shown in FIGURE 10*b*. It comprises two AND gates 123 and 124 connected to an OR gate 125. This small network serves to produce the error bit $f_2$, taking into account a burst-error of length $\leq 3$ which either starts at bits $w_1$ or $w_2$ or which starts at bit $w_{45}$.

The last two gates, corresponding to 78 and 79 of FIGURE 7 of each network $Z \cdot [G_i]^{-1}$, are shown in FIGURES 10*c* and 10*d*, respectively. The next to last gate, corresponding to 78 of FIGURE 1, includes two AND gates 126 and 127 followed by an OR gate 129. The first gate 126 corrects for a burst-error of length $\leq 3$ which starts in the third from the last bit. For example, in the case of network 111, which produces error bits $f_1 \ldots f_9$ corresponding to the bits $\hat{w}_1 \ldots \hat{w}_9$ gate 126 corrects for any error of length $\leq 3$ which starts with bit $\hat{w}_7$ In the event of such an error and if in fact the bit $\hat{w}_8$ is in error, then $v_2$ will be 1 and AND gate 126 will produce an output equal to $f_8'$. It should be noted here that FIGURE 10*c* is general and that in the case of network 111 $j=0$ so that $v_{j+1}$ is equal to $v_1$ and $f'_{8+9j}$ is equal to $f_8'$.

If the burst-error of length $\leq 3$ extends beyond bit $w_9$ and starts at bit $f_8$ in this particular example, then AND gate 127 corrects for this error. This gate, in this particular example, receives the input $f_8'$ from network 112 and the input $v_2$ from network 112 and produces an output which is equal to $f_8$. Again, note that in the example of network 111, $j=0$ so that $f'_{8+7j}=f_8'$.

From the explanation above, the network of FIGURE 10*d* should be self-explanatory. In the case of FIGURE 1, it produces the corrected output $f_9$ for correctable bursts. In the case of network 112 it produces the output $f_{16}$ for correctable bursts an so on.

It should be noted that in the arrangement of FIGURE 9 the convention is adopted that the network 111 produces outputs $f_1 \ldots f_9$, a total of 9 error bits. The networks 112–116 each produces only 7 errors bits. In each of these networks, the $f$ bit producing circuits for the first 5 stages employ a single AND gate such as 73 of FIGURE 7. This AND gate receives the bits $f_i'$ and $v_i$ and produces the output $f_i$.

The last network 117 is required only to produce the bit $f_{45}$ and an output the bits $f_{43}'$ and $f_{44}'$ to be fed back to network 116, and the bits $f_1'$ and $f_2'$ to be fed back to network 11. It does so by means of the appropriate EXCLUSIVE OR gates and a single AND gate analogous to 73.

Serial System

In the systems discussed up to this point, the word W is transmitted in parallel, that is, all the bits are transmitted at the same time. In the system to be discussed now, the bits are transmitted serially and the decoding is performed in a serial manner. While this method of operation requires more time, it needs less equipment.

Again, before proceeding to the circuit, it is necessary to introduce some additional principles of matrix mathematics. In the serial decoder, using the same example as above, namely, a word with 36 information bits and 9 check bits, the matrices $[G_1]$ and $[G_1]^{-1}$ are chosen as before. In addition, the following 9 matrices are chosen:

$[G_2'] = $[rows 6 to 14 of [H]]
$[G_3'] = $[rows 11 to 19 of [H]]
$[G_4'] = $[rows 16 to 24 of [H]]
.
.
.
$[G_9'] = $[rows 41 . . . 45, 1 . . . 4 of [H]]

Table VII below is inserted for the purpose of showing the inter-relation among the various $[G_i']$ matrices.

TABLE VII

| Row | | | |
|---|---|---|---|
| 1 | 1 0 0 0 0 0 0 0 1 | | |
| 2 | 0 1 0 0 0 0 0 1 0 | | |
| 3 | 0 0 1 0 0 0 1 0 0 | | |
| 4 | 0 0 0 1 0 1 0 0 0 | | |
| 5 | 0 0 0 0 1 0 0 0 0 | $[G_1]$ | (11) |
| 6 | 1 1 0 0 0 0 0 0 0 | | |
| 7 | 0 0 1 0 0 0 0 0 1 | | |
| 8 | 0 0 0 1 0 0 0 1 0 | | |
| 9 | 0 0 0 0 1 0 1 0 0 | | |

| Row | | | |
|---|---|---|---|
| 6 | 1 1 0 0 0 0 0 0 0 | | |
| 7 | 0 0 1 0 0 0 0 0 1 | | |
| 8 | 0 0 0 1 0 0 0 1 0 | | |
| 9 | 0 0 0 0 1 0 1 0 0 | | |
| 10 | 0 0 0 0 0 1 0 0 0 | $[G_2']=R_1[G_1]$ | (30) |
| 11 | 0 1 1 0 0 0 0 0 0 | | |
| 12 | 1 0 0 1 0 0 0 0 0 | | |
| 13 | 0 0 0 0 1 0 0 0 1 | | |
| 14 | 0 0 0 0 0 1 0 1 0 | | |

It may be observed from Table VII that matrix 30, $[G_2']$ is obtained by making the second column of $[G_1]$ the first column, making the third column of $[G_1]$ the second column . . . and making the first column of $[G_1]$ the last column. In other words, columns 1–9 of $[G_1]$ are rearranged to be columns 9, 1, 2 . . . 8. This rearrangement is called a cyclic right shift of the columns of $[G_1]$ through one column position, denoted in symbolic terms by:

$$[G_2']=R_1[G_1] \qquad (31)$$

In a similar manner, the general equation for $i=2 \ldots 9$ is $$[G_i']=R_{(i-1)}[G_1] \qquad (32)$$

It can also be shown, for $i=2 \ldots 9$, $[G_i']$ given by Equation 31; and $[G_1]^{-1}$ given by Equation 14*a*; that:

$$[G_i']^{-1}=D_{(i-1)}[G_1]^{-1} \qquad (33)$$

where $D_{(i-1)}[G_1]^{-1}$ denotes a downward cyclic shift of the rows of $[G_1]^{-1}$ through $(i-1)$ rows. Put in other words, a downward cyclic shift, for example, of 1 is the rearrangement of rows 1 through 9 of $[G_1]^{-1}$ in the order 9, 1, 2 . . . 8.

Employing an analysis similar to that used in obtaining Equation 19, it can be shown that:

$$Z(F)\cdot[G_i]^{-1}=Z(F)\cdot D_{(i-1)}[G_1]^{-1} = (s_{i+1}, s_{i+2} \ldots s_9, s_1, \ldots s_i)\cdot[G_1]^{-1} \qquad (34)$$

where $(s_{i+1}, s_{i+2} \ldots s_9, s_1 \ldots s_i)$ is obtained from $(s_1 \ldots s_9)=Z$ by a cyclic left shift of $i$ digits.

In a manner similar to that employed in connection with Equation 19, one may define:

$$Z(F)\cdot[G_i']^{-1}=F_i=(f_{i1}', f_{i2}' \ldots f_{i9}') \qquad (35)$$

The network of FIGURE 12 may now be employed to determine from $F_i$ whether there is a burst of length $\leq 3$ with a 1 among the first five digits. If there is such a burst, then $v_i$ will be a 1. The operation of this network is believed to be self-evident from the explanation of the operation of the network of FIGURE 8. A few examples will suffice for the explanation. First, assume that $f_{i1}$ is a 1 and $f_{14}$ is also a 1. In this case, NAND gate 150 produces a 0 output and $v_i$ is a 0. If, on the other hand, $f_{i1}$ is a 1 and $f_{i2} \ldots f_{i9}$ are all 0, then all NAND gates 150–155 produce a 1 output and $v_i$ will equal a 1.

A complete system which employs serial transmission and serial decoding is illustrated in FIGURE 11. A clock pulse source 450 produces 1 clock $t_1$ each unit of time. The pulses $t_1$ are applied to a 1 to 45 counter 451 which applies its output to the count of 44 decoder 452, and the count of 45 decoder 453. When the count of 44 is reached, the count of 44 decoder produces an output which is applied to the set terminal of flip-flop 454. The output obtained from the flip-flop in its set condition disables the count of 44 decoder 452 and actuates the pulser 455. The latter produces an output pulse which resets the 1 to 45 counter 451. The output pulse produced by the count of 44 decoder 452 is also applied to OR gate 456.

The clock pulses $t_1$ are also applied to a 1 to 5 frequency divider 457. The latter produces 1 output pulse $t_5$ every fifth input pulse it receives.

The input information pulses $\hat{w}_i$ occur serially in synchronism with the clock pulses $t_1$. These information pulses are applied to a switch 156. The switch is normally open but is closed in response to each clock pulse $t_1$. Thus, each information pulse $\hat{w}_i$ is applied through the switch 156 both to a 45 stage shift register 158 and a stepping or commutator switch 160. The input bits $\hat{w}_i$ are shifted from stage-to-stage of shift register 158 in response to the clock pulses $t_1$. Accordingly, after 45 time intervals, that is, after 45 clock pulses $t_1$, the shift register 158 is entirely loaded, as shown schematically in the figure.

The formation bits $\hat{w}_i$ passing through switch 156 are applied by the stepping switch 160 to a 5-stage register 162. The stepping switch initially connects switch 156 to the first or uppermost stage of register 162. Each clock pulse $t_1$ serves to step the switch to the next stage of register 162. Thus, after the first clock pulse, the stepping switch connects to the second stage of the register and so on.

After the first 5 received pulses $\hat{w}_1 \ldots \hat{w}_5$, the register 162 is fully loaded. It stores the bits $\hat{w}_1$ through $\hat{w}_5$, reading from top to bottom. The 6th information pulse is applied by the stepping switch 160 to the first stage of the register so that after the 6th clock pulse $t_1$, the register stores the bits $\hat{w}_6, \hat{w}_2 \ldots \hat{w}_5$. After the 45th time interval, the register 162 is loaded with the bits $\hat{w}_{41} \ldots \hat{w}_{45}$, as shown schematically in FIGURE 11.

The register 162 is connected through 5 switches, illustrated by a single block 164, to the 9-stage serial adder 166. The switches are normally open but are closed each 5th time interval by the timing pulse $t_5$.

Each stage of the serial adder 166 consists of a storage circuit (ST), such as 167, followed by an EXCLUSIVE OR gate, such as 168. The storage circuit is shown in more detail in the legend of FIGURE 11. It includes a set-reset flip-flop 169, an AND gate 170 connected to the set terminal of the flip-flop and a NOR gate 171 connected to the reset terminal of the flip-flop. The timing pulse $t_5$ serves as a priming signal for AND gate 170 and is also applied through inverter 172 as a priming signal for NOR gate 171. The input information from an EXCLUSIVE OR gate is applied via lead 173 both to the NOR gate 171 and the AND gate 170. The 1 output terminal of flip-flop 169 is connected through a delay means 174 to 1 input to the following EXCLUSIVE OR gate. The delay $\Delta t$ which is inserted is less than one unit of time and, in fact, less than the interval of pulse $t_5$. The purpose of the delay is to give each EXCLUSIVE OR gate in the adder 162 sufficient time to apply the information applied to it by a storage circuit ST preceding that gate to the storage circuit following that gate.

The connection of the register 162 through the switches 164 to the serial adder 166 is such that after the initial 5 units of time the serial adder stores the information bits $\hat{w}_1 \ldots \hat{w}_5$ in the order $\hat{w}_1, \hat{w}_2, \hat{w}_3, \hat{w}_4, \hat{w}_5, \hat{w}_4, \hat{w}_3, \hat{w}_2, \hat{w}_1$. This corresponds to the data in column 1 of Table I on page 6 of this specification, with $\hat{w}_5$ substituted for $\lambda$.

The serial adder 166 is connected through 9 switches, illustrated as a single block 181, to the 9-stage shift register 190. The switches are normally open and are closed one interval of time after the pulse $t_R$ occurs. The one unit delay is inserted by delay means 191.

The shift signal for the register 190 is the timing pulse $t_5$. Each time this timing pulse occurs, the information present in the register is shifted one place to the left. The register is reset by the timing pulse $t_R$.

Register 190 is connected to the network 192 for calculating $Z\cdot[G_1]^{-1}$. The output of this network is applied through 9 switches, illustrated by a single block 194, to a 9-stage shift register 196. The switches are normally open, however, under certain conditions (discussed later), they are closed in response to an output from AND gate 195 each time pulse $t_5$ occurs. The information present in register 196 is shifted to the right in synchronism with the clock pulses $t_1$.

The output of switches 194 is also applied to circuit 198. The latter is the circuit of FIGURE 12 and it produces the output $v_1$. As previously mentioned, $v_1$ is a 1 in the case of a correctable error and a 0 at all other times.

The signal $v_1$ is applied to the set terminal of flip-flop 200 and to one input of AND gate 202. The output of flip-flop 200 is applied to AND gate 204, to 7 unit delay means 206, and to inverter 208. The output of the circuit 206 is applied through an OR gate 210 to the reset terminal of flip-flop 200 and is also applied directly to the set terminal of flip-flop 212.

The output of inverter 208 is applied to AND gate 195. The output of AND gate 195 is applied to control switches 194 and also to trigger the modulo 9 counter 214. The output of the modulo 9 counter 214 is applied to an AND gate 216. The second input to this AND gate is the output of a flip-flop 218. The output of AND gate 216 is applied to an OR gate 220.

Returning for a moment to the 9-stage shift register 190, the bit stored in the leftmost stage of this register is applied through a 1 unit delay means 222 to the set terminal of flip-flop 218.

In the operation of the circuit of FIGURE 11, the imput signals $\hat{w}_i$ are applied serially to the 45-stage shift register 158. After 5 intervals of time, 5 of the bits $\hat{w}_5 \ldots \hat{w}_1$ are stored in the shift register 158. The same 5 bits are stored in the 5-stage register 162. At that time the pulse $t_5$ occurs and the 5 bits in register 162 are applied via the now closed switches 164 to the serial adder 166.

After another 5 intervals of time, the bits $\hat{w}_{10}, \hat{w}_9 \ldots \hat{w}_1$ are stored in register 158. The information bits $\hat{w}_6 \ldots \hat{w}_{10}$ are stored in register 162. The bits stored in the adder 166 are shifted one place to the right. The serial adder 166 therefore is storing the bits $\hat{w}_1$ through $\hat{w}_5$ in the following order:

$\hat{w}_1, \hat{w}_1, \hat{w}_2, \hat{w}_3, \hat{w}_4, \hat{w}_5, \hat{w}_4, \hat{w}_3, \hat{w}_2.$ At this same time, the second pulse $t_5$ closes switches 164. This causes the next 5 information bits $\hat{w}_6 \ldots \hat{w}_{10}$ to be applied to the EXCLUSIVE OR gates of the adder so that the EXCLUSIVE OR gates add the new information with the previously stored information.

The new information is applied to the 9 stages of the serial adder 166 in the following order:

$\hat{w}_6, \hat{w}_7, \hat{w}_8, \hat{w}_9, \hat{w}_{10}, \hat{w}_9, \hat{w}_8, \hat{w}_7, \hat{w}_6.$ As already mentioned, the old information is present in the first through the 9th stages in the order $\hat{w}_1, \hat{w}_1, \hat{w}_2, \hat{w}_3, \hat{w}_4, \hat{w}_5, \hat{w}_4, \hat{w}_3, \hat{w}_2.$ Accordingly, the adder performs the addition of:

$$w_6w_7w_8w_9w_{10}w_9w_8w_7w_6$$

$$\oplus w_1w_1w_2w_3w_4\ w_5w_4w_3w_2$$

This addition corresponds exactly to the addition of the first two bits, respectively, in each row of Table I.

$\hat{w}_1$ corresponds to the numeral 1 in column 1, row 1 of Table I and $\hat{w}_6$ to the numeral 5 in column 2, line 1

(note that $\hat{w}_6=\hat{x}_5$). The second $\hat{w}_1$ corresponds to the numeral 1 in column 1, line 9 of Table I and $\hat{w}_7$ (which is $\hat{x}_5$)

corresponds to the numeral 6 in column 2, line 9. As a third example, $\hat{w}_5$ (which is the check bit $\hat{a}_5$)

corresponds to λ in column 1, row 5 of Table I and $\hat{w}_9$ (which is the information bit $\hat{x}_8$)

corresponds to the numeral 8 in column 2, row 5 of Table I.

The steps above continue until, after 45 time intervals, the adder 166 has obtained the sum of every row in Table I, substituting a check bit wherever λ appears in the table. The adder 166, in other words, has performed, in serial fashion, precisely the same function as the syndrome generator shown in FIGURE 3 performs in parallel fashion. The result of the addition is the syndrome $Z=s_1 \ldots s_9$.

At the 44th time interval, the timing signal $t_R$ occurs. This signal is delayed one additional interval by the one unit delay circuit 191 so that at the 45th time interval the switches 181 close. The closed switches apply the syndrome $Z=s_1 \ldots s_9$ to the 9-stage shift register 190. Immediately prior to the receipt of this information, the register 190 was cleared by the reset signal $t_R$ which, it will be recalled, occurs at the 44th unit of time.

As the syndrome is available, the circuit 192 can now compute $Z\cdot[G_1]^{-1}$. The EXCLUSIVE OR gates for doing this are precisely the EXCLUSIVE OR gates of FIGURE 7. The error bits thereby obtained are applied to the switches 194 which are closed (this is discussed later).

The switches 194 apply the error bits to the shift register 196 and also to the circuit 198. The circuit 198 is the one shown in greater detail in FIGURE 11, that is, it is the circuit for calculating whether there is a burst-error of length ≦3. If there is, then $v_i$, which in this particular case is $v_1$, is a 1. If $v_1$ is a 1, it sets flip-flop 200 which produces a priming signal for AND gate 204. If at the same time $f_1'$ is a 1, then AND gate 204 produces a 1 output (an error signal $\alpha=1$) which serves as one input to EXCLUSIVE OR gate 230 at the upper part of the figure. Due to various delays in the circuit, this error signal $\alpha$, if it is present, occurs after a delay interval $y\Delta t$, the same delay as inserted by delay circuit 232. Therefore, when the error signal $\alpha$ is applied to EXCLUSIVE OR gate 230, a bit stored in the shift register, the bit $\hat{w}_1$ in this particular example, is also applied to the EXCLUSIVE OR gate. The bit in this way automatically is corrected and a corrected output $\tilde{w}_1$ appears at output lead 234.

After 5 intervals of time, the syndrome $Z=s_1 \ldots s_9$ is cyclicly shifted one place to the left by the timing pulse $t_5$. The shifted syndrome bits are now applied to the network 192 so that, for example, EXCLUSIVE OR gate 71 of FIGURE 7 receives the bit $s_2$ rather than $s_1$, EXCLUSIVE OR gate 65 receives the bit $s_3$ rather than $s_2$ and . . . EXCLUSIVE OR gate 66 receives the bit $s_1$ rather than $s_9$. The effect of all of this is to make the network 192 solve Equation 34, that is, solve the equation $Z\cdot[G_2]^{-1}$. This permits the network to compute the error bits $f_6'-f_{14}'$. These error bits permit the $$\text{information bits } \hat{w}_6 \ldots \hat{w}_{10}$$

to be corrected in the same manner as already discussed in connection with the $$\text{error bits } \hat{w}_1 \ldots \hat{w}_5.$$

The circuit of FIGURE 11 continues to operate until all 45 error bits have been corrected. To summarize, after 45 time intervals, the 45 stage shift register is fully loaded and the syndrome is calculated. After 45 additional delay intervals, if there is a burst-error which is correctable, it has been corrected. During this additional 45 delay intervals, a second word $W_2$ can be received and loaded into the shift register 158. During the third 45 delay intervals, this second word can be processed in the same manner as already discussed.

A number of the circuit elements shown at the bottom of the figure are for indicating correctable or non-correctable errors. If $v_1$ is a 1, indicating a correctable error, flip-flop 200 become set and AND gate 204 is primed. Also, AND gate 202 is primed. When flip-flop 200 is set, the inverter 208 applies a disabling signal to AND gate 195. The flip-flop 200, once set, remains set for at least 7 time intervals and therefore AND gate 195 remains disabled for this same period. Therefore, for 7 time intervals, at least, the AND gate 195 maintains the switches 194 disabled. On the other hand, if $v_i$ is a 0, flip-flop 200 is not set, AND gate 195 is primed, and each 5th time interval the pulse $t_5$ passes through AND gate 195 and causes switches 194 to close.

If $v_i$ is a 1 and flip-flop 200 becomes set, then after 7 time intervals, the delay means 206 produces an output. This output passes through OR gate 210 and resets the flip-flop 200. This output is also applied directly to the set terminal S of flip-flop 212 and the latter applies a priming signal to AND gate 202.

It should be recalled at this point that the present circuit is capable of correcting only a single burst-error. Therefore, if after one burst-error has occurred and flip-flop 200 has become set, and then reset and then another burst-error occurs, the circuit should indicate that the second burst-error is uncorrectable. It does this by means of the circuit just described. The second burst-error causes $v_i$ to become 1 again. AND gate 202 is primed by the set flip-flop 212. The second $v_i=1$ therefore passes through AND gate 202 and OR gate 220. The output of this OR gate is a signal indicating an uncorrectable error.

If the output $v_i$ is never a 1, within a 45 unit time interval and $s_i=1$, this indicates that there is an uncorrectable error. Should this occur, the $s_i=1$ output of register 190 occurring sometime during the 45 unit time delay passes through delay means 222 and sets flip-flop 218. The output of this flip-flop serves as a priming signal for AND gate 216. The modulo 9 counter produces an output after eight pulses $t_5$ have been applied thereto by AND gate 195. (The ninth pulse resets the counter to zero). This output is applied as the second input to AND gate 216 and serves to enable this gate. The enabled AND gate 216 applies an "uncorrectable error" signal to OR gate 220. This same signal (UE) may be used also to reset the MOD 9 counter.

General Remarks

While for purposes of illustration, the invention has been illustrated for the case in which $n=36$, $k=9$ and $b=3$ the invention is, of course, of more general applicability. The tables which follow illustrate the way in which the subsets may be chosen for other illustrative values of $n$, $k$ and $b$. The circuits employed for the system, in any particular case, while differing in detail from the specific circuits illustrated, follow the design criteria outlined herein and operate in the same way as the circuits shown and described herein.

TABLE VIII ($n=78$; $k=13$; $b=5$)

[Check Bits: $a_i=\sum_{i\epsilon S_j} x_{ji}$; $i=1 \ldots 13$]

| | | | | | | | | | | | | | |
|---|---|---|---|---|---|---|---|---|---|---|---|---|---|
| $S_1$ | 1 | 7 | 14 | 21 | 28 | 35 | 42 | λ | 54 | 59 | 64 | 69 | 74 |
| $S_2$ | 2 | 7 | 13 | 20 | 27 | 34 | 41 | 48 | λ | 60 | 65 | 70 | 75 |
| $S_3$ | 3 | 8 | 13 | 19 | 26 | 33 | 40 | 47 | 54 | λ | 66 | 71 | 76 |
| $S_4$ | 4 | 9 | 14 | 19 | 25 | 32 | 39 | 46 | 53 | 60 | λ | 72 | 77 |
| $S_5$ | 5 | 10 | 15 | 20 | 25 | 31 | 38 | 45 | 52 | 59 | 66 | λ | 78 |
| $S_6$ | 6 | 11 | 16 | 21 | 26 | 31 | 37 | 44 | 51 | 58 | 65 | 72 | λ |
| $S_7$ | λ | 12 | 17 | 22 | 27 | 32 | 37 | 43 | 50 | 57 | 64 | 71 | 78 |
| $S_8$ | 6 | λ | 18 | 23 | 28 | 33 | 38 | 43 | 49 | 56 | 63 | 70 | 77 |
| $S_9$ | 5 | 12 | λ | 24 | 29 | 34 | 39 | 44 | 49 | 55 | 62 | 69 | 76 |
| $S_{10}$ | 4 | 11 | 18 | λ | 30 | 35 | 40 | 45 | 50 | 55 | 61 | 68 | 75 |
| $S_{11}$ | 3 | 10 | 17 | 24 | λ | 36 | 41 | 46 | 51 | 56 | 61 | 67 | 74 |
| $S_{12}$ | 2 | 9 | 16 | 23 | 30 | λ | 42 | 47 | 52 | 57 | 62 | 67 | 73 |
| $S_{13}$ | 1 | 8 | 15 | 22 | 29 | 36 | λ | 48 | 53 | 58 | 63 | 68 | 73 |

Code Work W=91 Digits=
| $x_1 \ldots x_6a_7$ Segment 1 | . . . | $x_{37} \ldots x_{42}a_{13}$ Segment 7 | . . . | $x_{73} \ldots x_{78}a_6$ Segment 13 |

TABLE IX ($n=39$; $k=13$; $b=3$)

| | | | | | | | | | | | | | |
|---|---|---|---|---|---|---|---|---|---|---|---|---|---|
| $S_1$ | 1 | 4 | 8 | 12 | λ | λ | λ | λ | λ | λ | λ | 36 | 38 |
| $S_2$ | 2 | 4 | 7 | 11 | 15 | λ | λ | λ | λ | λ | λ | λ | 39 |
| $S_3$ | 3 | 5 | 7 | 10 | 14 | 18 | λ | λ | λ | λ | λ | λ | λ |
| $S_4$ | λ | 6 | 8 | 10 | 13 | 17 | 21 | λ | λ | λ | λ | λ | λ |
| $S_5$ | λ | λ | 9 | 11 | 13 | 16 | 20 | 24 | λ | λ | λ | λ | λ |
| $S_6$ | λ | λ | λ | 12 | 14 | 16 | 19 | 23 | 27 | λ | λ | λ | λ |
| $S_7$ | λ | λ | λ | λ | 15 | 17 | 19 | 22 | 26 | 30 | λ | λ | λ |
| $S_8$ | λ | λ | λ | λ | λ | 18 | 20 | 22 | 25 | 29 | 33 | λ | λ |
| $S_9$ | λ | λ | λ | λ | λ | λ | 21 | 23 | 25 | 28 | 32 | 36 | λ |
| $S_{10}$ | λ | λ | λ | λ | λ | λ | λ | 24 | 26 | 28 | 31 | 35 | 39 |
| $S_{11}$ | 3 | λ | λ | λ | λ | λ | λ | λ | 27 | 29 | 31 | 34 | 38 |
| $S_{12}$ | 2 | 6 | λ | λ | λ | λ | λ | λ | λ | 30 | 32 | 34 | 37 |
| $S_{13}$ | 1 | 5 | 9 | λ | λ | λ | λ | λ | λ | λ | 33 | 35 | 37 |

Code Word W=52 Bits= | $x_1x_2x_3a_{10}$ Segment 1 | $x_4x_5x_6a_{11}$ Segment 2 | . . . | $x_{37}x_{38}x_{39}a_9$ Segment 13 |

TABLE X ($n=21$; $k=7$; $b=2$)

| | | | | | | | |
|---|---|---|---|---|---|---|---|
| $S_1$ | 1 | 4 | 8 | 12 | λ | 18 | 20 |
| $S_2$ | 2 | 4 | 7 | 11 | 15 | λ | 21 |
| $S_3$ | 3 | 5 | 7 | 10 | 14 | 18 | λ |
| $S_4$ | λ | 6 | 8 | 10 | 13 | 17 | 21 |
| $S_5$ | 3 | λ | 9 | 11 | 13 | 16 | 20 |
| $S_6$ | 2 | 6 | λ | 12 | 14 | 16 | 19 |
| $S_7$ | 1 | 5 | 9 | λ | 15 | 17 | 19 |

Code Word W=28 Bits= | $x_1x_2x_3a_4$ Segment 1 | . . . | $x_{19}x_{20}x_{21}a_3$ Segment 7 |

As mentioned previously, and as can be seen from Table IX, λ may occupy one or more spaces in a column. When there is more than one empty space in each column of [V] then the check bit in a segment corresponding to a column is the one associated with the row in which the lowermost λ in that column appears. In the case of the first column of Table IX, for example, the associated segment is $(x_0x_1x_2a_9)$. The successive segments specified by the successive columns of this table will be $$x_1x_2x_3a_9=E_1 \qquad x_{22}x_{23}x_{24}a_3=E_8$$
$$x_4x_5x_6a_{10}=E_2 \qquad x_{25}x_{26}x_{27}a_4=E_9$$
$$x_7x_8x_9a_{11}=E_3 \qquad x_{28}x_{29}x_{30}a_5=E_{10}$$
$$x_{10}x_{11}x_{12}a_{12}=E_4 \qquad x_{31}x_{32}x_{33}a_6=E_{11}$$
$$x_{13}x_{14}x_{15}a_{13}=E_5 \qquad x_{34}x_{35}x_{36}a_7=E_{12}$$
$$x_{16}x_{17}x_{18}a_1=E_6 \qquad x_{37}x_{38}x_{39}a_8=E_{13}$$
$$x_{19}x_{20}x_{21}a_2=E_7$$

As a general proposition, each segment E, in this case, is also a group of contiguous information bits $x_1 \ldots x_m$ followed by a check bit $a_p$ where $p$ for segments 1, 2 . . . $k$ are, respectively, $(k-b-1)$, $(k-b)$ . . . $k$, 1, 2 . . . $(k-b-2)$ and $b=$[the largest integer $$\leq (k-2)/3]$$

In the previous discussion, attention is given to the example given by the matrix [V] in Table I. All the considerations are identical for both the cases illustrated by Tables I and IX. In the case of codes with more than one empty space per column of [V] there is a small difference in the correction procedure, as discussed below.

In the case of codes in the type shown in Table IX, the matrix $[G_1]$ (corresponding to Table III on page 16) will be of the form shown in Table XI below.

TABLE XI $$[G_1]=\left[\begin{array}{c:c:c} 1000 & 00000 & 0001 \\ 0100 & 00000 & 0010 \\ 0010 & 00000 & 0100 \\ 0000 & 00000 & 1000 \\ 1100 & 00000 & 0000 \\ 0010 & 00000 & 0001 \\ 0001 & 00000 & 0010 \\ 0000 & 00000 & 0100 \end{array}\right]$$

This matrix is not rectangular. However, if the zeros indicated in the dashed rectangle in Table XI are removed, a rectangular matrix [H] is obtained, as shown in Table XII:

TABLE XII $$[H]=\begin{bmatrix} 1&0&0&0&0&0&0&1 \\ 0&1&0&0&0&0&1&0 \\ 0&0&1&0&0&1&0&0 \\ 0&0&0&0&1&0&0&0 \\ 1&1&0&0&0&0&0&0 \\ 0&0&1&0&0&0&0&1 \\ 0&0&0&1&0&0&1&0 \\ 0&0&0&0&0&1&0&0 \end{bmatrix}$$

One may obtain the inverse $[H]^{-1}$ of [H] of Table XII as shown in the Table XIII.

TABLE XIII $$[H]^{-1}=\begin{bmatrix} 1&0&1&0&0&1&0&1 \\ 1&0&1&0&1&1&0&1 \\ 0&0&1&0&0&0&0&1 \\ 1&1&1&0&1&1&1&1 \\ 0&0&0&1&0&0&0&0 \\ 0&0&0&0&0&0&0&1 \\ 1&1&1&0&1&1&0&1 \\ 0&0&1&0&0&1&0&1 \end{bmatrix}$$

And the matrix $[G]^{-1}$ is then as shown in Table XIV.

TABLE XIV $$[G]^{-1}=\begin{bmatrix} 1&0&1&0&0&1&0&1 \\ 1&0&1&0&1&1&0&1 \\ 0&0&1&0&0&0&0&1 \\ 1&1&1&0&1&1&1&1 \\ 0&0&0&0&0&0&0&0 \\ 0&0&0&0&0&0&0&0 \\ 0&0&0&0&0&0&0&0 \\ 0&0&0&0&0&0&0&0 \\ 0&0&0&0&0&0&0&0 \\ 0&0&0&0&1&0&0&0 \\ 0&0&0&0&0&0&0&1 \\ 1&1&1&0&1&1&0&1 \\ 0&0&1&0&0&1&0&1 \end{bmatrix}$$

In Equation 19 (page 18) the errors beginning in the first segment of the code word $F_\alpha$, were obtained by forming the product $F_\alpha=Z(F)\cdot[G_1]^{-1}$. In the present case, a new product $Z(F)*[G_1]^{-1}$ is defined, as follows:

$$F_\alpha=Z(F)*[G_1]^{-1}=Z(F)\cdot[G_1]^{-1}V\bigvee_{i=5}^{9} s_i\cdot(\overbrace{10\ldots01}^{8})$$

where $Z(F)=(s_1\ s_2\ \ldots\ s_{13})$ and "V" stands for logical OR.

This "*" product is in effect the union (Logical OR) of the earlier defined "·" product and the term $$\bigvee_{i=5}^{9} s_i\cdot(\overbrace{10\ldots01}^{8})$$

If all the errors within the digits are included in $[G_1]$ (the first 8 digits of the code word), then $s_i=0$ for $i=5$ . . . 9. (Notice that $[G_1]$ has zeros in columns 5 to 9.) Therefore, $$Z(F)*[G_1]^{-1}=Z(F)\cdot[G_1]^{-1}=F_\alpha$$

If all the errors are not within the first eight digits of the code word then $Z(F)*[G_1]^{-1}$ will be a burst of length $>3$.

The first part of the network comprising the "*" product will be the network corresponding to the "·" product. Let $$Z(F)\cdot[G_1]^{-1} \text{ be } (f_1'\ f_2'\ f_3'\ f_4'\ f_5'\ f_6'\ f_7'\ f_8')$$

and $$Z(F)*[G_1]^{-1} \text{ be } (f_1'\ f_2'\ \ldots\ f_7'\ f_8')$$

The middle six bits of the "*" product will be the same as the middle six digits of the "·" product. The two end bits $f_1'$ and $f_8'$ are obtained as follows:

$$f_1'=f_1''v\bigvee_{i=5}^{9} s_i$$

and $$f_8'=f_8''v\bigvee_{k=5}^{9} s_i$$

All the remaining operations of decoding in the two cases are exactly analogous.

As mentioned previously, $k$ is an odd integer. For $k=9$ or $k=$a prime number $\geq 9$ the number of empty spaces $\lambda$ in the matrix of sub-sets [V] is just 1. In these cases each code word will have $k(k-1)/2$ information digits. For $k=$a prime $\leq 79$, the number of information digits in a code word with $k$ check digits and the maximum length of a correctable burst-error are listed in the Table XV.

For any $k\geq 9$, if $k$ is an odd number then another code may be defined in which the number of empty spaces in each column of the matrix [V] is given by $[k-2b]$ where $b$ is the maximum correctable burst-error length for the code, and $$b=\left[\text{the largest integer} \geq \left(\frac{k-2}{3}\right)\right]$$

TABLE XV

A list of EBEC-codes when the number of check digits, $k$, is a prime $11 \leq k \leq 79$

| Number of check digits: $k$ | Number of information digits: $\frac{k(k-1)}{2}$ | Max. correctable burst length |
|---|---|---|
| 11 | 55 | 2 |
| 13 | 78 | 5 |
| 17 | 136 | 5 |
| 19 | 171 | 7 |
| 23 | 253 | 7 |
| 29 | 406 | 9 |
| 31 | 465 | 10 |
| 37 | 666 | 11 |
| 41 | 820 | 13 |
| 43 | 903 | 14 |
| 47 | 1,081 | 14 |
| 53 | 1,378 | 17 |
| 59 | 1,711 | 19 |
| 61 | 1,830 | 20 |
| 67 | 2,211 | 23 |
| 71 | 2,485 | 16 |
| 73 | 2,628 | 18 |
| 79 | 3,081 | 22 |

What is claimed is:

1. A system for correcting errors in a string of bits $x_1 \ldots x_n$ comprising, in combination:

means for selecting $k$ sub-sets $S_i$ of said information bits such that an information bit appears only once in a particular sub-set, each information bit is included in two sub-sets, and no two sub-sets contain the same pair of information bits;

means for generating a check bit for each said sub-set of information bits;

a transmitting circuit receiving inputs from said means for selecting and from said means for generating, and providing a word W consisting of a string of said $n$ bits arranged in segments, each segment containing a group of different information bits, less in number than the bits of a sub-set, and a check bit, each information bit of a segment being chosen from a different sub-set and said check bit being that of another sub-set;

means receptive of the word $\hat{W}$ for generating a syndrome Z which has bits all of the same value when there is no error in the received bits and which has a distinctive pattern of 0's and 1's indicative of a burst error of length $\leq b$ if there is such an error;

memory means responsive to the syndrome Z for producing a binary error word F which has bits of one value in positions corresponding to those occupied by bits of word $\hat{W}$ which are not in error, and bits of the other value in positions corresponding to those of bits of word $\hat{W}$ which are in error; and means responsive to the word $\hat{W}$ and to the error word F for producing a corrected word $\tilde{W}$, where:

$n$ in an integer $k$ and $b$ are integers which are smaller than $n$, $\hat{W}$ is the word W, as received, and may or may not be equal to W.

2. A system as set forth in claim 1 wherein said memory means comprises a decoder responsive to said syndrome for producing a memory address, and read-only memory means responsive to said address for reading out, in parallel, the bits of said error word.

3. A system as set forth in claim 1 wherein said memory means comprises a content-addressed memory.

4. A system for correcting errors in a string of bits $x_1 \ldots x_n$ comprising, in combination:

means for selecting $k$ sub-sets $S_1 \ldots S_k$ of said information bits, where $S_1 \ldots S_k$ are rows in a matrix [V] having $k$ columns and $k$ rows, the first column $V_1$ of which consists of information bits having the subscripts: $1, 2 \ldots t, \lambda, t \ldots 2$; 1 and each succeeding $i$'th column $V_i$ of which consists of information bits having the subscripts $t(i-1)+1, t(i-1) \ldots ti, \lambda, ti, \ldots t(i-1), t(i-1)+1$, cyclicly shifted down through $i$ rows, where: $i=1, 2 \ldots k$; $\lambda$ indicates an odd number of empty spaces; $t$ is less than $k/2$; and, $k$ is an odd integer;

means for generating a parity check bit for each said sub-set of information bits;

a transmitting circuit receiving inputs from said means for selecting and from said means for generating, and providing a word W consisting of a string of said $n$ bits arranged in segments, each segment containing a group of different information bits less in number than the bits of a sub-set and a check bit, each information bit of a segment being chosen from a different sub-set and said check bit being that of yet another sub-set;

means receptive of the word $\hat{W}$ for generating a syndrome Z which has bits all of the same value when there is no error in the received bits and which has a distinctive pattern of 0's and 1's indicative of a burst-error of length $\leq b$ if there is such an error; and means responsive to the word $\hat{W}$ and to the syndrome Z for producing a corrected word $\tilde{W}$;

where:

$n$ is an integer larger than $k$ $\hat{W}$ is the word W, as received, and may be equal or unequal to W, and $b$ is an integer which is smaller than $n$.

5. The system set forth in claim 4 wherein each $i$'th segment comprises the $t$ information bits in column $i$ of matrix [V] and the check bit is $a_j$, the check bit for sub-set $S_j$, where $j$ identifies a row of column $i$ in which $\lambda$ appears, where $j=1, 2 \ldots k$.

References Cited

UNITED STATES PATENTS 3,246,315 4/1966 Gear ____________ 340—166 X

OTHER REFERENCES

W. W. Peterson, "Error-correcting Codes," pp. 231–234, MIT Press and John Wiley & Sons, Inc., New York, 1961.

MALCOLM A. MORRISON, Primary Examiner

R. S. DILDINE, Jr., Assistant Examiner

PO-1050
(5/69)

UNITED STATES PATENT OFFICE
CERTIFICATE OF CORRECTION

Patent No. 3,478,313 Dated November 11, 1969

Inventor(s) C. V. Srinivasan

It is certified that error appears in the above-identified patent and that said Letters Patent are hereby corrected as shown below:

Col. 5, line 58, "$Z(a_5) = Z(\hat{w}_5)$" should be ---$Z(\hat{a}_5) = Z(\hat{w}_5)$---.

Col. 7, line 20, "0000101000" should be ---000010100---.
Col. 12, line 21, "$\hat{w}_1 \ldots \hat{w}$ should be ---$\hat{w}_1 \ldots \hat{w}_4$---.

Col. 12, line 26 "correction" should be ---correctable---.
Col. 12, line 43, "$[G]^{-1}$" should be ---$[G_2]^{-1}$---.

Col. 12, Table VI, line 59, "[Rows 1 to 9 of $[H] = [Q_1] =$" should be ---[Rows 1 to 9 of $[H] = [G_1] =$ ---.

Col. 13, line 36, "$f_1'$ " should be ---$f_i'$---.

Col. 14, line 25, "$f'_{8+9}$" should be ---$f'_{8+7}$---.

Col. 15, line 59, "$f_{14}$" should be ---$f_{i4}$---.

Col. 16, line 17, "formation" should be ---information---.
Col. 17, line 40, "imput" should be ---input---.
Col. 20, line 3, Table VIII, "[Check bits: $a_i = \Sigma$ xji; i=1...13]" should be ---[Check bits: $\hat{a}_j = \Sigma x_i$; i=1...13]---.

SIGNED AND
SEALED
JUL 28 1970

(SEAL)
Attest:

Edward M. Fletcher, Jr.
Attesting Officer

WILLIAM E. SCHUYLER, JR.
Commissioner of Patents